United States Patent
Odinak et al.

(10) Patent No.: US 9,014,362 B2
(45) Date of Patent: *Apr. 21, 2015

(54) SYSTEM AND METHOD FOR PROCESSING MULTI-MODAL COMMUNICATIONS WITHIN A CALL CENTER

(71) Applicant: Intellisist, Inc., Seattle, WA (US)

(72) Inventors: Gilad Odinak, Bellevue, WA (US); Alastair Sutherland, Seattle, WA (US)

(73) Assignee: Intellisist, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/457,050

(22) Filed: Aug. 11, 2014

(65) Prior Publication Data

US 2014/0348320 A1 Nov. 27, 2014

Related U.S. Application Data

(63) Continuation of application No. 13/909,062, filed on Jun. 3, 2013, now Pat. No. 8,804,938, which is a continuation of application No. 13/305,671, filed on Nov. 28, 2011, now Pat. No. 8,457,296, which is a continuation of application No. 11/981,860, filed on Oct. 31, 2007, now Pat. No. 8,068,595, which is a continuation-in-part of application No. 10/367,533, filed on Feb. 14, 2003, now Pat. No. 7,292,689.

(60) Provisional application No. 60/403,354, filed on Aug. 13, 2002, provisional application No. 60/364,555, filed on Mar. 15, 2002.

(51) Int. Cl.
| | | |
|---|---|---|
| *H04M 3/00* | (2006.01) | |
| *H04M 5/00* | (2006.01) | |
| *H04M 11/00* | (2006.01) | |
| *H04M 3/51* | (2006.01) | |
| *H04M 3/53* | (2006.01) | |
| *H04M 3/493* | (2006.01) | |
| *H04W 4/12* | (2009.01) | |

(Continued)

(52) U.S. Cl.
CPC ........ *H04M 3/5183* (2013.01); *H04M 3/42059* (2013.01); *H04M 3/42221* (2013.01); *H04M 3/51* (2013.01); *H04M 3/5322* (2013.01); *H04M 3/533* (2013.01); *H04M 2201/38* (2013.01); *H04M 2201/39* (2013.01); *H04M 2201/40* (2013.01); *H04M 2201/60* (2013.01); *H04M 2203/306* (2013.01); *H04M 2203/357* (2013.01); *H04M 2203/4536* (2013.01); *H04M 3/4936* (2013.01); *H04W 4/12* (2013.01)

(58) Field of Classification Search
USPC ............... 379/265.01, 88.13, 265.02, 265.05, 379/210.01, 88.01; 704/270.1; 455/412.1, 455/412.2
See application file for complete search history.

(56) References Cited

U.S. PATENT DOCUMENTS

| | | |
|---|---|---|
| 4,956,852 A | 9/1990 | Hodge |
| 4,979,118 A | 12/1990 | Kheradpir |

(Continued)

FOREIGN PATENT DOCUMENTS

WO 01/47218 6/2001

*Primary Examiner* — Thjuan K Addy
(74) *Attorney, Agent, or Firm* — Patrick J.S. Inouye; Krista A. Wittman

(57) ABSTRACT

A system and method for processing multi-modal communications is provided. A call is received into a call center via a telephone. The call includes an inquiry of incoming speech utterances from a caller. The call is assigned to an agent within the call center. Transcribed text is generated by performing automatic speech recognition on the incoming speech utterances. The transcribed text is displayed to the agent via a display. Text messages from the caller are separately received into the call center via the telephone during the call. The text messages are identified as originating from the caller of the call and displayed to the agent.

20 Claims, 19 Drawing Sheets

(51) Int. Cl.
*H04M 3/42* (2006.01)
*H04M 3/533* (2006.01)

(56) References Cited

U.S. PATENT DOCUMENTS

| | | | |
|---|---|---|---|
| 5,206,903 A | 4/1993 | Kohler et al. |
| 5,444,774 A | 8/1995 | Frieds |
| 5,479,487 A | 12/1995 | Hammond |
| 5,524,147 A | 6/1996 | Bean |
| 5,546,447 A | 8/1996 | Skarbo et al. |
| 5,570,410 A | 10/1996 | Hooshiari |
| 5,592,542 A | 1/1997 | Honda et al. |
| 5,646,986 A | 7/1997 | Sahni et al. |
| 5,657,461 A | 8/1997 | Harkins et al. |
| 5,696,811 A | 12/1997 | Maloney et al. |
| 5,715,306 A | 2/1998 | Sunderman et al. |
| 5,740,238 A | 4/1998 | Flockhart et al. |
| 5,799,067 A | 8/1998 | Kikinis et al. |
| 5,809,423 A | 9/1998 | Benveniste |
| 5,825,869 A | 10/1998 | Brooks et al. |
| 5,825,870 A | 10/1998 | Miloslavsky |
| 5,828,747 A | 10/1998 | Fisher et al. |
| 5,857,018 A | 1/1999 | Sumner et al. |
| 5,884,032 A | 3/1999 | Bateman et al. |
| 5,903,641 A | 5/1999 | Tonisson |
| 5,903,877 A | 5/1999 | Berkowitz et al. |
| 5,905,793 A | 5/1999 | Flockhart et al. |
| 5,933,492 A | 8/1999 | Turovski |
| 5,940,487 A | 8/1999 | Bunch et al. |
| 5,940,496 A | 8/1999 | Gisby et al. |
| 5,940,497 A | 8/1999 | Miloslavsky |
| 5,946,386 A | 8/1999 | Rogers et al. |
| 5,946,387 A | 8/1999 | Miloslavsky |
| 5,946,388 A | 8/1999 | Walker et al. |
| 5,951,638 A | 9/1999 | Hoss et al. |
| 5,960,073 A | 9/1999 | Kikinis et al. |
| 5,963,632 A | 10/1999 | Miloslavsky |
| 5,970,065 A | 10/1999 | Miloslavsky |
| RE36,416 E | 11/1999 | Szlam et al. |
| 5,982,856 A | 11/1999 | Cohn et al. |
| 5,982,873 A | 11/1999 | Flockhart et al. |
| 5,991,394 A | 11/1999 | Dezonno et al. |
| 5,995,614 A | 11/1999 | Miloslavsky |
| 5,995,615 A | 11/1999 | Miloslavsky |
| 6,046,762 A | 4/2000 | Sonesh et al. |
| 6,064,730 A | 5/2000 | Ginsberg |
| 6,170,011 B1 | 1/2001 | Macleod Beck et al. |
| 6,173,052 B1 | 1/2001 | Brady |
| 6,173,053 B1 | 1/2001 | Bogart et al. |
| 6,185,292 B1 | 2/2001 | Miloslavsky |
| 6,212,178 B1 | 4/2001 | Beck et al. |
| 6,282,284 B1 | 8/2001 | Dezonno et al. |
| 6,289,094 B1 | 9/2001 | Miloslavsky |
| 6,330,327 B1 | 12/2001 | Lee et al. |
| 6,334,103 B1 | 12/2001 | Surace et al. |
| 6,393,015 B1 | 5/2002 | Shtivelman |
| 6,401,061 B1 | 6/2002 | Zieman |
| 6,408,064 B1 | 6/2002 | Fedorov et al. |
| 6,459,892 B2 | 10/2002 | Burgan et al. |
| 6,473,505 B1 | 10/2002 | Khuc et al. |
| 6,487,277 B2 | 11/2002 | Beyda et al. |
| 6,517,587 B2 | 2/2003 | Satyavolu et al. |
| 6,560,329 B1 | 5/2003 | Draginich et al. |
| 6,598,073 B2 | 7/2003 | Fukasawa et al. |
| 6,618,476 B1 | 9/2003 | Szeto et al. |
| 6,668,044 B1 | 12/2003 | Schwartz et al. |
| 6,668,169 B2 | 12/2003 | Burgan et al. |
| 6,687,241 B1 | 2/2004 | Goss |
| 6,704,394 B1 | 3/2004 | Kambhatla et al. |
| 6,707,899 B2 | 3/2004 | Saito et al. |
| 6,724,887 B1 | 4/2004 | Eilbacher et al. |
| 6,732,156 B2 | 5/2004 | Miloslavsky |
| 6,771,766 B1 | 8/2004 | Shafiee et al. |
| 6,778,660 B2 | 8/2004 | Fromm |
| 6,898,277 B1 | 5/2005 | Meteer et al. |
| 6,904,143 B1 | 6/2005 | Peterson et al. |
| 6,917,799 B2 | 7/2005 | Ross et al. |
| 6,937,705 B1 | 8/2005 | Godfrey et al. |
| 6,944,150 B1 | 9/2005 | McConnell et al. |
| 6,981,021 B2 | 12/2005 | Takakura et al. |
| 6,996,531 B2 * | 2/2006 | Korall et al. .................. 704/270 |
| 7,043,193 B1 | 5/2006 | Vashi et al. |
| 7,106,850 B2 | 9/2006 | Campbell et al. |
| 7,110,525 B1 | 9/2006 | Heller et al. |
| 7,123,709 B1 | 10/2006 | Montgomery et al. |
| 7,149,788 B1 | 12/2006 | Gundla et al. |
| 7,174,010 B2 | 2/2007 | McIlwaine et al. |
| 7,203,285 B2 | 4/2007 | Blair |
| 7,219,054 B1 | 5/2007 | Begeja et al. |
| 7,219,138 B2 | 5/2007 | Straut et al. |
| 7,284,049 B2 | 10/2007 | Safstrom et al. |
| 7,299,263 B2 | 11/2007 | Claudatos et al. |
| 7,302,466 B1 | 11/2007 | Satapathy et al. |
| 7,346,539 B1 | 3/2008 | Atkinson et al. |
| 7,400,879 B2 | 7/2008 | Lehaff et al. |
| 7,424,718 B2 | 9/2008 | Dutton |
| 7,450,698 B2 | 11/2008 | Bushey et al. |
| 7,450,937 B1 | 11/2008 | Claudatos et al. |
| 7,460,659 B2 | 12/2008 | Shambaugh et al. |
| 7,471,653 B2 | 12/2008 | McConnell et al. |
| 7,599,861 B2 | 10/2009 | Peterson |
| 7,606,909 B1 | 10/2009 | Ely et al. |
| 7,627,096 B2 | 12/2009 | Bushey et al. |
| 7,627,109 B2 | 12/2009 | Mitra |
| 7,657,005 B2 | 2/2010 | Chang |
| 7,657,465 B2 | 2/2010 | Freishtat et al. |
| 7,725,098 B1 | 5/2010 | Claudatos et al. |
| 7,734,022 B1 | 6/2010 | Croak et al. |
| 7,751,551 B2 | 7/2010 | Bushey et al. |
| 7,769,161 B1 | 8/2010 | Hession et al. |
| 7,769,587 B2 | 8/2010 | Cardillo et al. |
| 7,895,283 B1 | 2/2011 | Hazy |
| 2001/0031641 A1 | 10/2001 | Ung et al. |
| 2001/0053977 A1 | 12/2001 | Schaefer |
| 2002/0006126 A1 | 1/2002 | Johnson et al. |
| 2002/0046030 A1 | 4/2002 | Haritsa et al. |
| 2002/0077823 A1 | 6/2002 | Fox et al. |
| 2003/0179876 A1 | 9/2003 | Fox et al. |
| 2004/0162724 A1 | 8/2004 | Hill et al. |
| 2005/0002514 A1 | 1/2005 | Shafiee et al. |
| 2005/0147090 A1 | 7/2005 | MacLeod Beck et al. |
| 2005/0213743 A1 | 9/2005 | Huet et al. |
| 2006/0062373 A1 | 3/2006 | Chervets et al. |
| 2006/0153356 A1 | 7/2006 | Sisselman et al. |
| 2007/0019801 A1 | 1/2007 | Brenneman et al. |

* cited by examiner

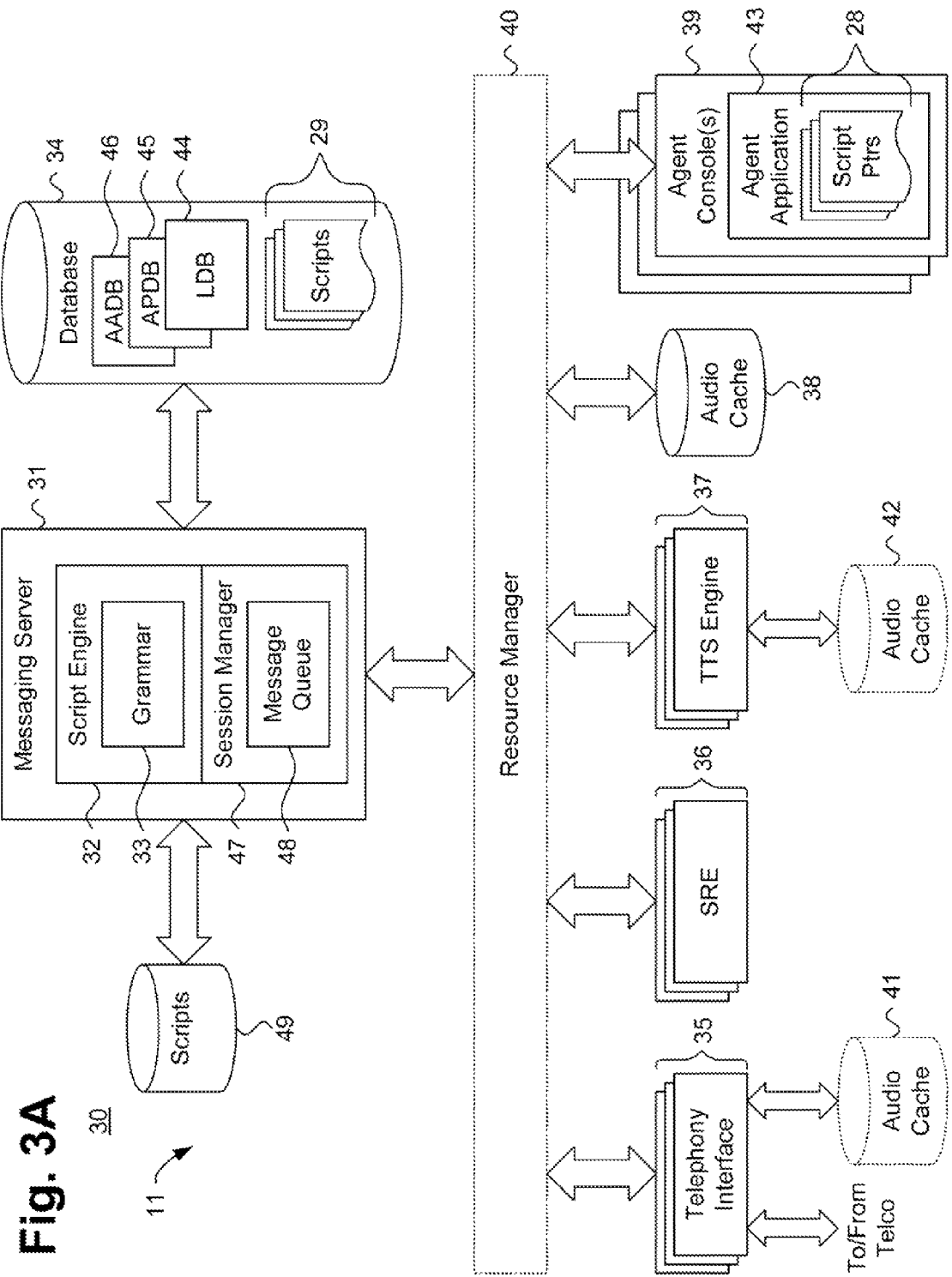

50

70

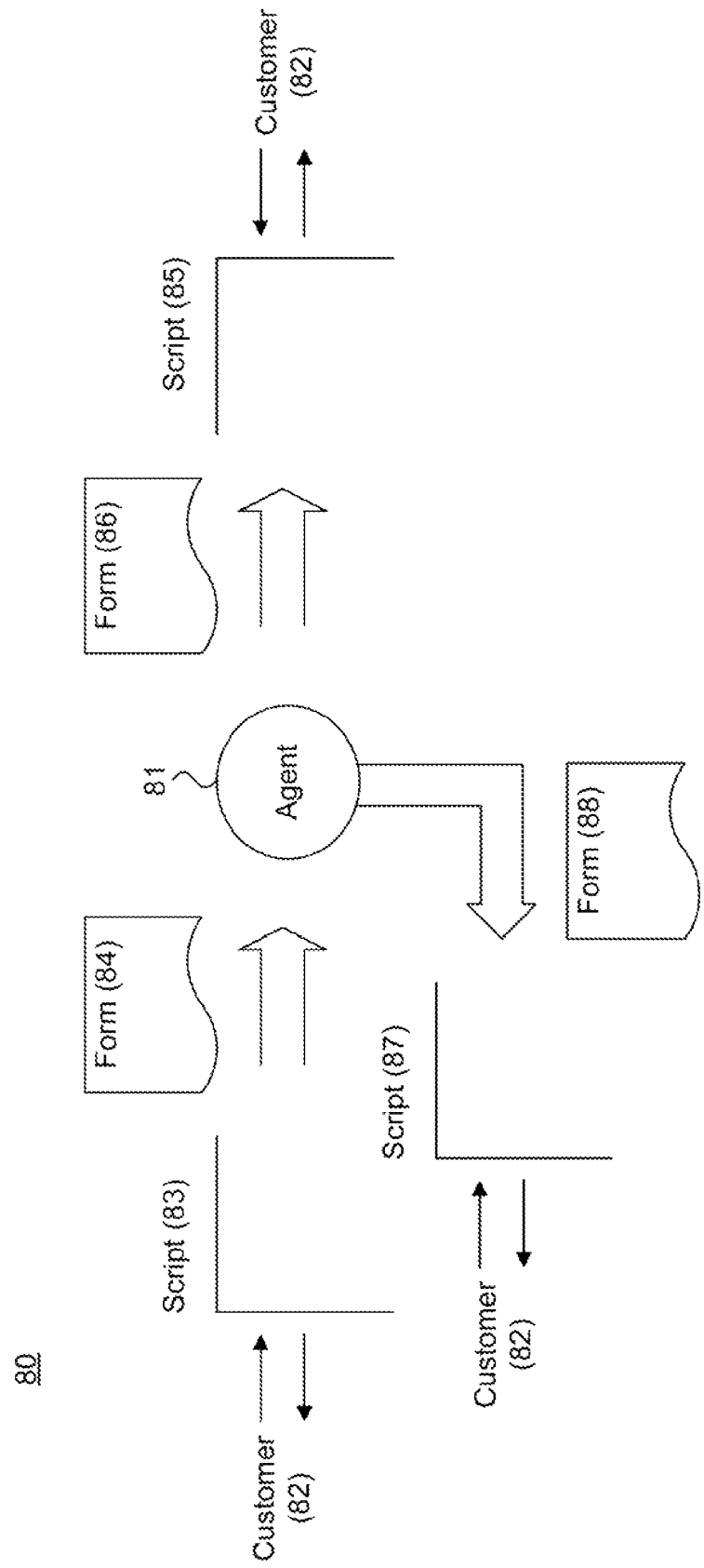

SYSTEM AND METHOD FOR PROCESSING MULTI-MODAL COMMUNICATIONS WITHIN A CALL CENTER

COPYRIGHT NOTICE

A portion of the disclosure of this patent document contains material, which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

CROSS-REFERENCE TO RELATED APPLICATION

This non-provisional patent application is a continuation of U.S. Pat. No. 8,804,938 issued Aug. 12, 2014, which is a continuation of U.S. Pat. No. 8,457,296 issued Jun. 4, 2013, which is a continuation of U.S. Pat. No. 8,068,595, issued on Nov. 29, 2011, which is a continuation-in-part of U.S. Pat. No. 7,292,689, issued on Nov. 6, 2007, which claims priority to U.S. provisional patent application, Ser. No. 60/364,555, filed Mar. 15, 2002 and U.S. provisional patent application, Ser. No. 60/403,354, filed Aug. 13, 2002, the disclosures of which are incorporated by reference.

FIELD

The present invention relates in general to automated call center operation and, in particular, to a computer-implemented system and method for processing user communications.

BACKGROUND

Customer call centers, or simply, "call centers," are usually the first direct point of contact for customers seeking direct assistance from manufacturers and service vendors. Call centers are reachable by telephone and provide a single source for customer support and problem resolution. Although World Wide Web-based customer support is becoming increasingly available via the Internet, call centers still offer a convenient and universally-available forum for remote customer assistance. In addition, for mobile callers, such as customers who are in a car and unable to access the Internet, call centers remain the only practical resource for receiving assistance on-the-go.

As customer satisfaction and good will depend significantly on service after the sale, vendors spend substantial time, money and effort in ensuring effective call center operation. Customer assistance professionals are trained in providing both effective and courteous communication and informed and accurate product and service information. Nevertheless, the volume of call traffic can often exceed the capabilities of human customer assistance agents, and a range of automated call center systems are presently used to help bridge the gap between the need to provide responsive assistance and the limits of human call center staff.

Typically, in existing automated call center systems, customers are put on hold until an agent is available to take their call. While on hold, an automated system typically collects information from the customer, such as account number, to determine a priority of service. Such a system may also provide automated menus that attempt to classify the call into basic transaction types, for instance, based on language spoken.

When an agent is available to take the call, the agent will greet the customer, may ask for identification information, and will attempt to determine the nature of the call, often by asking for the same information that the customer previously provided to the automated system. The agent then takes some action, such as performing troubleshooting and providing the caller with instructions for resolving the problem. Further, to assist in improving customer support, the agent will usually log the customer information provided by the caller.

Each customer call is typically an interactive process. During the interaction, the agent may put the customer on hold while the agent gathers information, takes notes, or sometimes handles other customers. Finally, after call completion, the agent will summarize the call as a call log entry. The interactive process is repeated for each new caller throughout the course of the day. This interactive process is time inefficient. Agents are forced to wait for customers to complete their instructions while customers similarly remain on hold while agents are assisting other callers, researching a problem resolution, or creating call logs.

A customer interaction system is described in U.S. Pat. No. 6,778,660, to Fromm, issued on Aug. 17, 2004, the disclosure of which is incorporated by reference. The system enables agents to simultaneously process voice contacts from telephonic callers by storing incoming voice signals for time-shiftable and fast playback. Calls are routed to assigned agents when possible. If an agent is busy, the user is asked to state his question for storage in one or more queues. An agent subsequently processes and responds to the question in person, in a manner similar to that utilized in Web chat interactions. Agents respond to voice recordings in the order in which received with additionally provided fast playback that enables an agent to catch up with recorded messages. However, both user and agent messages remain as spoken speech recorded in an audible, non-textual format and accordingly require the full attention of the assigned agent.

Accordingly, there is a need for an approach to providing automated call center operation that allows highly responsive caller support with a minimum of agent idle time and caller hold time.

There is a further need for an approach to providing efficient caller message processing using transcribed and synthesized speech utterances as an internal medium of communication within the automated call center.

SUMMARY

In the described embodiment, an agent and customer communicate through voice messages using a digitized voice-driven system. From the customer perspective, the experience appears to be an interaction with an intelligent machine. The interaction is similar to calling a legacy automated call center system staffed with human agents, but the customers are aware that the agent is automated, not human.

Preferably, the system voice is clear and human-like, but is recognizable as a machine voice. Slight delays in responses can occur compared to speaking with a human agent, although the customer does not have to repeat information already provided and is generally not put on hold. Upon request, the system can repeat the information provided to the customer, and consistently appears to be patient and polite.

Operationally, the system differs from legacy systems. Instead of providing full-time voice-to-voice communications, the system gives agents the ability to control a continuum of increasingly automated responses in the form of a "sliding" control. For most interactions, every customer speech utterance is recorded and stored, is digitally transcribed into a text message and is presented to an off-line agent through a visual interface on a workstation. The agent can read or optionally listen to each utterance upon arrival, as well as to previous utterances. As well, the agent can annotate or manually re-transcribe each of the customer utterances as needed.

Once a session has been established, each human agent can communicate indirectly with customers by typing written responses at their workstation. Each written response is converted into speech following completion and is played to the customer.

The agent can also choose pre-formed responses, thereby saving time and communicating in a consistent, uniform manner. The pre-formed responses can include an associated form containing parameterized variable fields that are completed by the agent or by the system to fill in, for example, dates or names. The completed pre-formed response is converted into speech. Alternatively, pre-formed responses can be pre-recorded as sound bites and staged in an audio cache for immediate playback.

In addition to indirect communication via their workstation, each human agent can also accept live calls from customers in a real time, voice-to-voice mode. Live call processing may be required to handle crises or other service needs that are not amenable to automation, or to provide those services to customers, which are not generally acceptable when provided via automation.

Communication can also occur between a customer and a human agent via text messaging, such as through the Short Message Service (SMS), as well as multi-modal communication, which includes a combination of voice and text messaging. The text communications can be automatically reviewed and stored as a log entry without requiring transcription. Multi-modal communication allows a customer to text information to the agent during the call session for providing additional data.

Furthermore, when an agent identifies a call that matches a recognized problem or frequently asked question, the agent can choose a predefined "script" to prompt and collect or simply provide the customer with information in a step-by-step manner. For example, a script could be used to collect a customer's personal information for a credit application, or to provide instructions on using a feature of a consumer product in a customer support application. Thus, the ability of an agent to interact with customers through manually or automated text responses converted into speech or through pre-recorded or live voice responses provides a flexible and sliding level of agent control adaptable to a wide range of customer service situations.

The system also provides an automatic journaling function. By the time each call ends, the system will have collected a complete and fully transcribed log of the conversation. The human agent need not manually transcribe a log entry, as the information contained in the system-generated log is already in a format that can be stored in a database and can be easily mined for data. Manual annotations can be added to the log entry, as needed.

Empirically, from an agent perspective, an average customer service call lasts seven minutes when using a legacy call center, of which two minutes are spent on an introduction and setup and an additional two minutes on wrap-up and documentation. The described embodiment eliminates most of the time spent on setup and wrap-up and reduces the time an agent spends on a call by about 30%. From a customer point of view, although the overall length of the call may be the same, hold times are eliminated while slight yet unobjectionably longer delays between agent's responses may occur.

With the extensive logging and visual presentation to the agent, the agent can keep track of more than one session with a customer. An agent may handle multiple calls simultaneously, while each customer will hardly notice any degradation in call quality. In the described embodiment, an agent can handle four calls simultaneously. However, an arbitrarily large number of simultaneous calls could be maintained by the system for each agent and would only be subject to physical computational constraints, such as available processing power and memory. Each agent is able to handle multiple calls by not having to listen to each customer as they speak. Instead, agents can listen to or read transcribed customer utterances and text messages, thereby each allowing their attention to be split among multiple calls. The ability to use pre-recorded forms to gather or provide standard information further increases an agent's ability to handle multiple calls. For example, while a customer is interacting with a script collecting personal information, such as first and last name, social security number, address and phone number, and so forth, the agent can handle other callers.

An embodiment provides a system and method for processing multi-modal communications within a call center. A call is received into a call center via a telephone. The call includes an inquiry of incoming speech utterances from a caller. The call is assigned to an agent within the call center. Transcribed text is generated by performing automatic speech recognition on the incoming speech utterances. The transcribed text is displayed to the agent via a display. Text messages from the caller are separately received into the call center via the telephone during the call. The text messages are identified as originating from the caller of the call and displayed to the agent.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 3A is a block diagram showing a system for providing a message-based communications infrastructure for automated call center operation, in accordance with one embodiment.

FIG. 6 is a process flow diagram showing, by way of example, the control flow followed in processing a script using the system of FIG. 3A.

FIG. 7A is a screen shot showing, by way of example, a set of call center service windows generated by the system of FIG. 1.

APPENDIX A provides a sample grammar for use in the described embodiment.

DETAILED DESCRIPTION

System for Providing a Message-Based Communications Infrastructure

Figure 1:
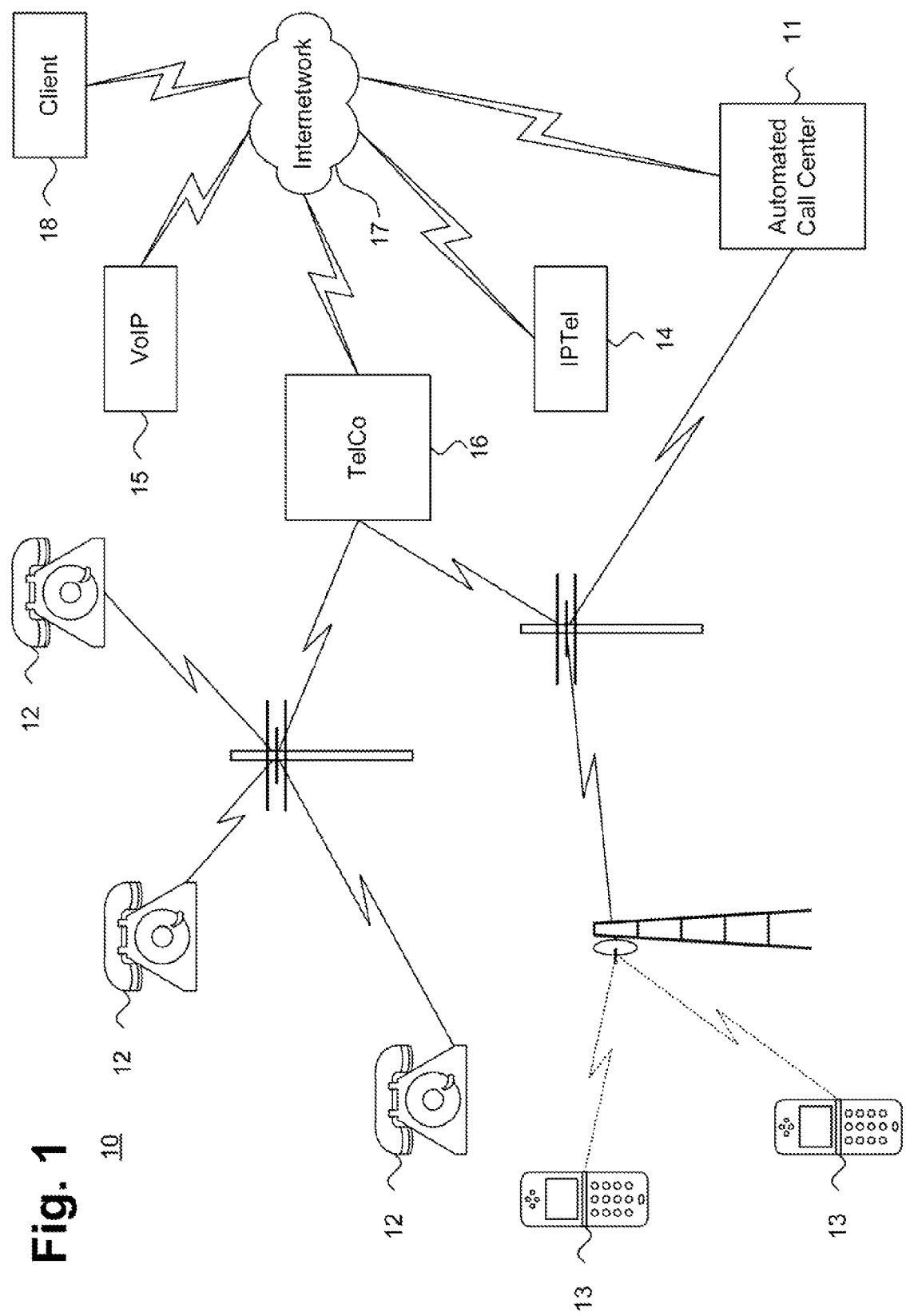
FIG. 1 is a functional block diagram showing an automated call center operational environment.

FIG. 1 is a functional block diagram showing an automated call center operational environment 10. By way of example, a multiplicity of users call into an automated call center 11, preferably through telephonic means, which can include voice or text messaging media. The telephonic means include Plain Old Telephone Service (POTS) 12, cellular and satellite telephones 13, Internet telephony (IPTel) 14, Voice over IP (VoIP) 15, short message service (SMS) text messaging, and other forms of telephony and voice-based communications, as would be recognized by one skilled in the art. Users could also call or interface to the automated call center 11 through data transmission means, such as an internetwork 17, including the Internet. The call can include voice communications, text messaging, or a combination of voice and text communications.

Independent of call origination, each user call is routed through a telephone company (Telco) public interchange 16 or equivalent call center to the automated call center 11. Although shown with reference to a Telco public interchange 16, any other form of telephonic or equivalent call networking system transmitting voice or data signals over various signal carrier mediums, including conventional land lines; radio, satellite or other forms of signal carriers; light wave or sound wave exchange systems; or equivalents thereof, could also be utilized, as would be recognized by one skilled in the art.

The automated call center 11 provides a single source for support and problem resolution for customers seeking direct assistance from manufacturers and service vendors, although automated call centers 11 can also be used in other areas of commerce, as would be recognized by one skilled in the art. The terms "user" and "customer" are used interchangeably herein and both refer to a caller to the automated call center 11. Although the automated call center 11 is shown as a single point within the automated call center operation environment 10, the automated call center 11 could consist of one or more logically interconnected but physically separate, including geographically removed, operations, which provide a logically unified automated call center, as would be recognized by one skilled in the art.

Figure 2:
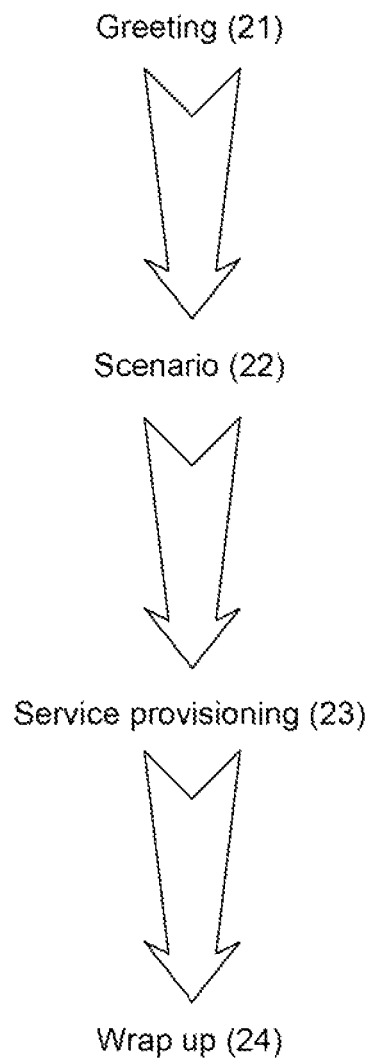
FIG. 2 is a process flow diagram showing, by way of example, a typical user call sequence, as transacted in the automated call center operational environment of FIG. 1.

FIG. 2 is a process flow diagram showing, by way of example, a typical user call sequence 20, as transacted in the automated call center operational environment 10 of FIG. 1. Upon calling into the automated call center 11, each user receives an initial greeting and an informational message providing a synopsis of caller options. The caller options enable the user to navigate through to a specific topic area for assistance or support. Following application, the user engages in a customer support scenario 22 with an agent, which is either a live person or an automated prompt, such as with an automated voice response system, to enable information collection and problem trouble-shooting. Note that the scenario 22 can be delayed by agent unavailability, caller volume capacity limits, and other factors that can delay customer response. As required, service provisioning 23 is provided to the user, either directly in the course of the call or indirectly through a service request dispatch. Finally, the call ends in a wrap-up 24, which provides closure to the call and a departing salutation. Other forms and variations of customer call sequences are feasible, as would be recognized by one skilled in the art. Importantly, however, from the perspective of the caller, the experience appears to be an interaction with an intelligent machine and the caller is aware that the agent is automated, not human. Accordingly, a typical caller will have a more relaxed expectation of agent responsiveness since a machine, and not an actual person, is on the line.

FIG. 3A is a block diagram showing a system 30 for providing a message-based communications infrastructure for automated call center 11 operation, also referred to as the Messaging Platform for Agent-Customer Transactions (MPACT) system 30, in accordance with the present invention. During regular operation, the MPACT system 30 executes multiple threads to process multiple simultaneous calls, which are handled by one or more agents executing agent applications 43 on agent consoles 39 (shown in FIG. 1). Alternatively, in a further embodiment, multiple MPACT systems 30 execute in parallel to provide enhanced performance through loosely- or tightly-coupled parallel processing.

The MPACT system 30 consists of the following components: database 34, telephony interface (TI) 35, one or more speech recognition engines (SREs) 36, one or more text-to-speech (TTS) engines 37, audio cache 38, one or more agent consoles 39, and optionally, resource manager 40. At least one instance of each component is generally required for the MPACT system 11 to operate, except that use of the resource manager 40 is optional, and is required only on larger systems that incorporate more than one instance of the other components. In the described embodiment, a messaging server 31, database 34, telephony interface 35, SREs 36, TTS engines 37 and audio cache 38 execute on a single computer system while one or more agent consoles 39 executing in parallel on separate computer systems. The different components communicate over an Internet Protocol (IP) network, which typically is implemented over high-speed local Ethernet. The MPACT system 30 components run on Intel/AMD-based servers under the Windows 2000 Server Operating System and Redhat Linux. Each agent console 39 runs on Intel/AMD-based workstations under the Windows 2000 Professional Operating System. Each of the components will now be described in further detail.

The individual computer systems, including MPACT system 30, are general purpose, programmed digital computing devices consisting of a central processing unit (CPU), random access memory (RAM), non-volatile secondary storage, such as a hard drive, network interfaces, and peripheral devices, including user interfacing means, such as a keyboard and display. Program code, including software programs, and data are loaded into the RAM for execution and processing by the CPU and results are generated for display, output, transmittal, or storage.

Each component is implemented as is a computer program, procedure or module written as source code in a conventional programming language, such as the C++ programming language, and is presented for execution by the CPU as object or byte code, as is known in the art. Alternatively, the components could also be implemented in hardware, either as integrated circuitry or burned into read-only memory components. The various implementations of the source code and object and byte codes can be held on a computer-readable storage medium or embodied on a transmission medium in a carrier wave. The MPACT system 30 operates in accordance with a sequence of process steps, as further described below with reference to FIG. 8.

Messaging Server

The messaging server 31 consists of a script engine 32 and session manager 47. The script engine 32 executes scripts 49 incorporating a grammar 33 that defines a set of executable instructions for specified and interactive question-and-response dialog, and a session manager 47 that includes a message queue 48 for staging transient user and agent messages. Script pointers ("Ptrs") 28 that identify the actual scripts 49 to be executed by the script engine 32 are maintained locally by each agent application 43. Alternatively, scripts 29 could be stored in the database 34 and the script pointers 28 would provide database pointers to the scripts 29. The messaging server 31 receives call control information from the telephony interface 35 and tracks logged-off, logged-on and signed-on agents. The messaging server 31 uses this information to establish sessions between agents and customers, as further described below with reference to FIG. 4.

The database 34 contains three primary specialized databases: log database (LDB) 44, agent profile database (APDB) 45, and agent application database (AADB) 46. The log database 44 provides a running journal as a structured log of each accepted call and stores each user message and agent message in a uniquely-identified record. Thus, agents are freed from the task of having to manually transcribe a telephone conversation following wrap-up. The agent profile database 45 allows the messaging server 31 to authenticate, log-on and sign-on agents into registered sessions. The agent application database 46 contains agent applications 43 that are executed on agent consoles 39. Optionally, the database 34 can also contain scripts 29. Other forms of specialized databases are possible, as would be recognized by one skilled in the art. Alternatively, the information stored in the log database 44, agent profile database 45, and agent application database 46 could be maintained in structured or unstructured form using a standard file, spreadsheet, or other data assemblage for information storage and retrieval, as is known in the art.

Definitionally, a signed-on agent is registered on the messaging server 31 and is actively processing calls. A logged-on agent is registered on the messaging server 31 but is not accepting calls. A logged-off agent is not registered on the messaging server 31.

For each session, the messaging server 31 receives customer calls through the telephony interface 35 and sends a stream of transcribed speech utterances as user messages to an agent assigned to handle the session. Note that one or more agents can be assigned to handle any given session and a hierarchy of areas of responsibility, such as speech transcription, customer interaction, controlling scripts, and so forth, can be delegated among several agents to ensure efficient call processing. Similarly, the messaging server 31 receives a stream of synthesized speech utterances as agent messages from an assigned agent application 43 and sends the agent messages to the customer through the telephony interface 35. The messages typically only contain digitized voice; however, Simultaneous Voice and Data (SVD), for example, Caller ID, can also be provided. The multiplexing and demultiplexing of SVD messages is handled at the telephony interface 35 and an agent console 39.

The script engine 32 executes individual scripts 49, which incorporate a pre-defined grammar 33. The grammar 33 specifies a set of instructions that can be used to create question-and-answer dialogs that are executable by an agent via the agent application 43 and thereby enables an agent to process simultaneously multiple calls. The scripts 49 are submitted by agents via an agent console 39 using the script pointers 28 during processing of customer calls, as further described below with reference to FIG. 6. Each script 49 defines a sequence of synthesized speech utterances sent to customers and transcribed speech responses received back as user messages. The speech utterances could be pre-recorded and staged in the audio cache 38. The user messages are used to populate a form (not shown) that is reviewed by the agent during service provisioning.

In a further embodiment, a call session can be multi-modal, that is, consisting of voice, text messaging, or a combination of both. The telephony interface 35 implements a text messaging gateway, in addition to providing conventional POTS and voice-based telephony services. The telephony interface 35 enables the messaging server 31 to accommodate both voice communications and text messaging, which can be voice- or text-only, or a combination of voice and text during any single session. Customer calls received by the call center through the telephony interface 35 are forwarded to the messaging server 31, which handles their processing according to type. For instance, text messages can be forwarded directly to an agent, whereas voice communications can require voice recognition processing before being displayable. Although both text messages and voice communications can simultaneously originate from the same customer, each might travel along a different path to the call center, depending upon the underlying telephone service. However, through a text message processor (not shown), the messaging server 31 can pair up separate streams of text messages and voice communications matching caller identification data to an on-going caller session.

In one embodiment, text messages are received through the Telco via an SMS gateway (not shown) implemented in the telephony interface 35, or other component, such as a data network gateway (not shown) that is directly interfaced to the internetwork 17 or other public data communications network. Upon receipt by the call center, the text messages are transmitted to the messaging server 31 for processing. A unique caller identification for call session identification is assigned to each text message. The messaging server can match each text message to an active customer call. For instance, based on shared caller identification data, the guide to which an active call is assigned can be located by the database for forwarding the text message to that guide. The text messages are also added to the database after the call session has terminated as part of the call log. Post-processing actions can be performed on saved text messages in a manner similar to voice communications. In addition, text messages can be specifically flagged as verbatim caller data, which would not be unreliable due to, for instance, improper voice recognition processing.

In a still further embodiment, communication between a customer and an agent at a call center can occur solely through text messaging. The text messages are similarly identified using unique caller identification data and the text messages received during a single call session can be stored together.

In a still further embodiment, a mobile caller, such as a driver of a vehicle, can interact with a call center as further described with reference to FIGS. 14-18. The mobile communications can include voice communication, text messaging, or a combination of voice and text communication. The messaging server 31 is able to retrieve mobile caller information in the same fashion as any other caller. However, additional data about the caller, which is unique to mobile use, may also be provided, such as locational data through Global Positioning Satellite interface.

Figure 3B:
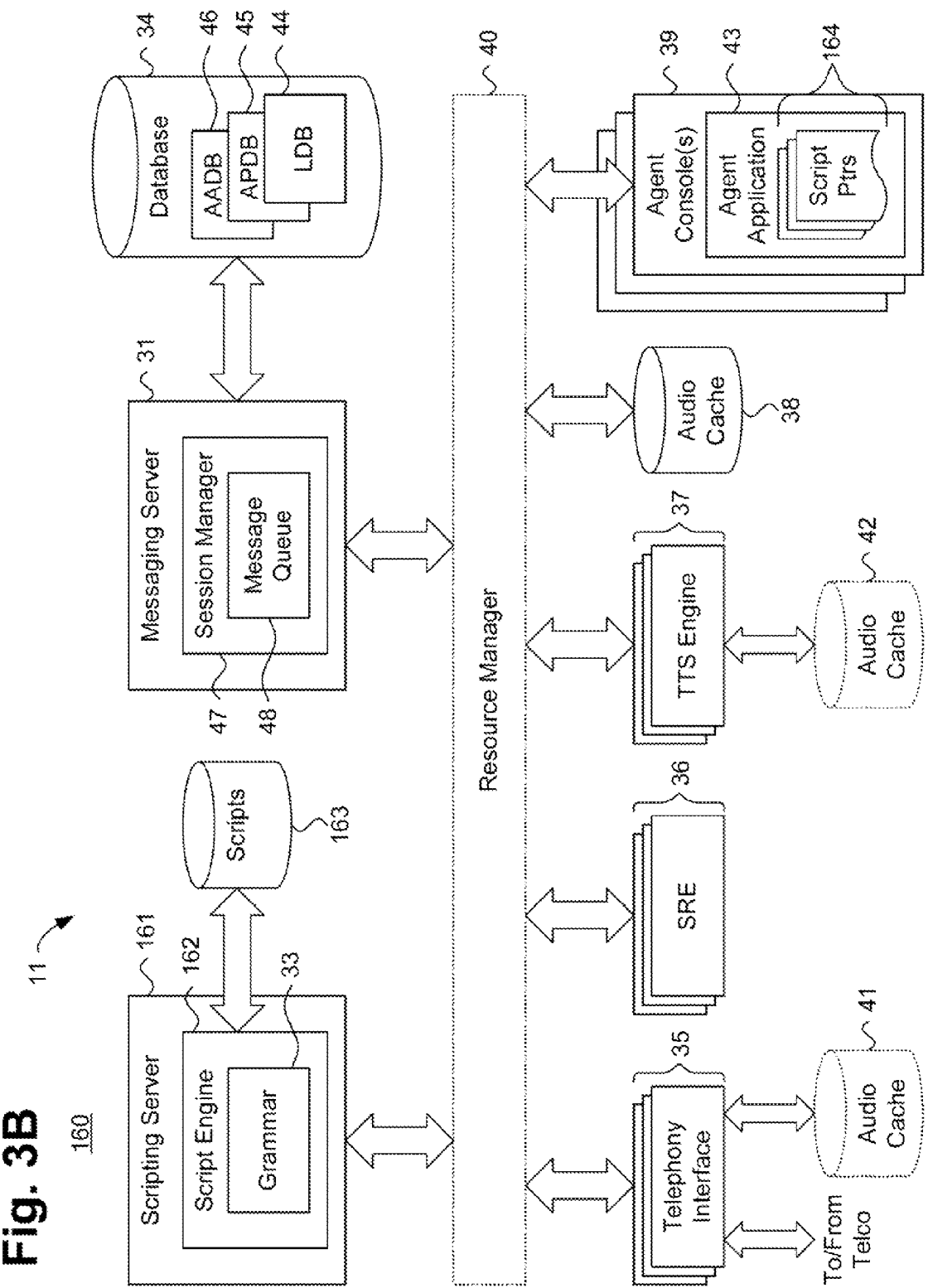
FIG. 3B is a block diagram showing a system for providing a message-based communications infrastructure for automated call center operation, in accordance with a further embodiment.

FIG. 3B is a block diagram showing a system 160 for providing a message-based communications infrastructure for automated call center operation, in accordance with a further embodiment. A scripting server 161 executes as a separate system from the messaging server 31, which preferably includes only the session manager 47 and message queue 48. Providing the functionality of the script engine 162 on a scripting server 161 enhances overall system throughput and performance by delegating script processing on a system separate from the messaging server 31.

The scripting server 161 consists of a dedicated script engine 162, which executes scripts 163 stored locally to the scripting engine 161. The scripts 163 also incorporate the grammar 33. Script pointers ("Ptrs") 164 that identify the actual scripts 163 to be executed by the script engine 162 are maintained locally by each agent application 43. Alternatively, scripts 29 (shown in FIG. 3A) could be stored in the database 34 and the script pointers 164 would provide database pointers to the scripts 29.

Telephony Interface

Referring back to FIG. 3A, customer calls are received through the telephony interface 35, which provides the external connection between the MPACT system 30 and the telephone company 16 (shown in FIG. 1). The primary purpose of the telephony interface 35 is to accept and process conventional telephone signals, including multiplexing, call routing, and queueing, as is known in the art. In the described embodiment, the telephony interface 35 consists of a third party hardware interface and software drivers, plus MPACT proprietary software that connects the third party package to the messaging server 31 and, in large systems, also to the resource manager 40. The MPACT system 30 supports standard telephony interface cards, such as analog and T1 Dialogic PCI cards. Optionally, the telephony interface 35 includes an audio cache 41 in which pre-recorded "canned" sound bites are stored for efficient playback. These sound bites provide informational and navigational messages to all callers. Optionally, two or more telephony interfaces 35 can be used to provide increased user call capacity. Other forms of telephony interface 35 could be used to accommodate various signal carrier mediums, including conventional land lines; radio, satellite or other forms of signal carriers; light wave or sound wave exchange systems; or equivalents thereof, as would be recognized by ones skilled in the art.

Speech Recognition Engine

User calls consist of ordinary spoken words, which must be transcribed into written text, for display, processing and storage. The purpose of the speech recognition engine 36 is to generate a stream of transcribed speech utterances that are recorded as computer-processable user messages. In the described embodiment, the speech recognition engine 36 consists of third party software and MPACT proprietary software that connects the third party package to the agent application 43 and, in large systems, also to the resource manager 40. The MPACT system 30 supports Speechworks and Nuance speech recognition engines. Optionally, two or more speech recognition engines 36 can be used to provide increased user call capacity.

In a further embodiment, a speech recognition engine executes on a client system 18 interfaced to the MPACT system 30 over the internetwork 17, or other data transmission means. The MPACT system 30 receives client messages already transcribed into text by the client system 18 for processing in the same manner as live calls received directly through the telephony interface 35.

Text-To-Speech Engine

Each caller into the MPACT system 30 receives feedback in the form of agent messages, which each consist of a stream of synthesized speech utterances. The synthesized speech utterances include greetings, questions, informational responses, and other spoken phrases that the user hears during the course of the session. The purpose of the text-to-speech engine 37 is to generate the stream of synthesized speech utterances formed as agent messages, which can be played back as reproducible audio. The text-to-speech engine 37 consists of third party software and MPACT proprietary software that connects the third party package to the agent application 43 and, in large systems, also to the resource manager 40. MPACT system 30 supports Speechworks' Speechify text-to-speech. Optionally, the text-to-speech engine 37 can include an audio cache 42 that stores pre-recorded "canned" sound bites, which provide efficient delivery of standardized synthesized speech utterances for use in scripts and repetitive agent actions. As well, two or more text-to-speech engines 37 can be used to provide increased user call capacity.

In a further embodiment, a text-to-speech engine executes on the client system 18 interfaced to the MPACT system 30 over the internetwork 17, or other data transmission means. The MPACT system 30 sends agent messages to the client system 18 for synthesis into speech. The synthesized speech is heard by the caller on the client system 18 in the same manner as a live call through telephonic means transacted directly through the telephony interface 35.

Agent Console

Each agent console 39 provides the primary means for direct customer interaction. The primary purpose of each agent console 39 is to execute one or more agent applications 43, stored in the agent application database 46, which display both user and agent messages and provide menus of actions that can be executed responsive to agent commands, including script execution, as further described below with reference to FIG. 6. In the described embodiment, one or more agent applications 43 execute on each agent console 39 and one or more agent consoles 39 execute in parallel. Alternatively, multiple instances of agent applications 43 can run on a server machine (not shown) and can be accessed by agents at agent consoles 39 operating as remote terminals.

Figure 7A:
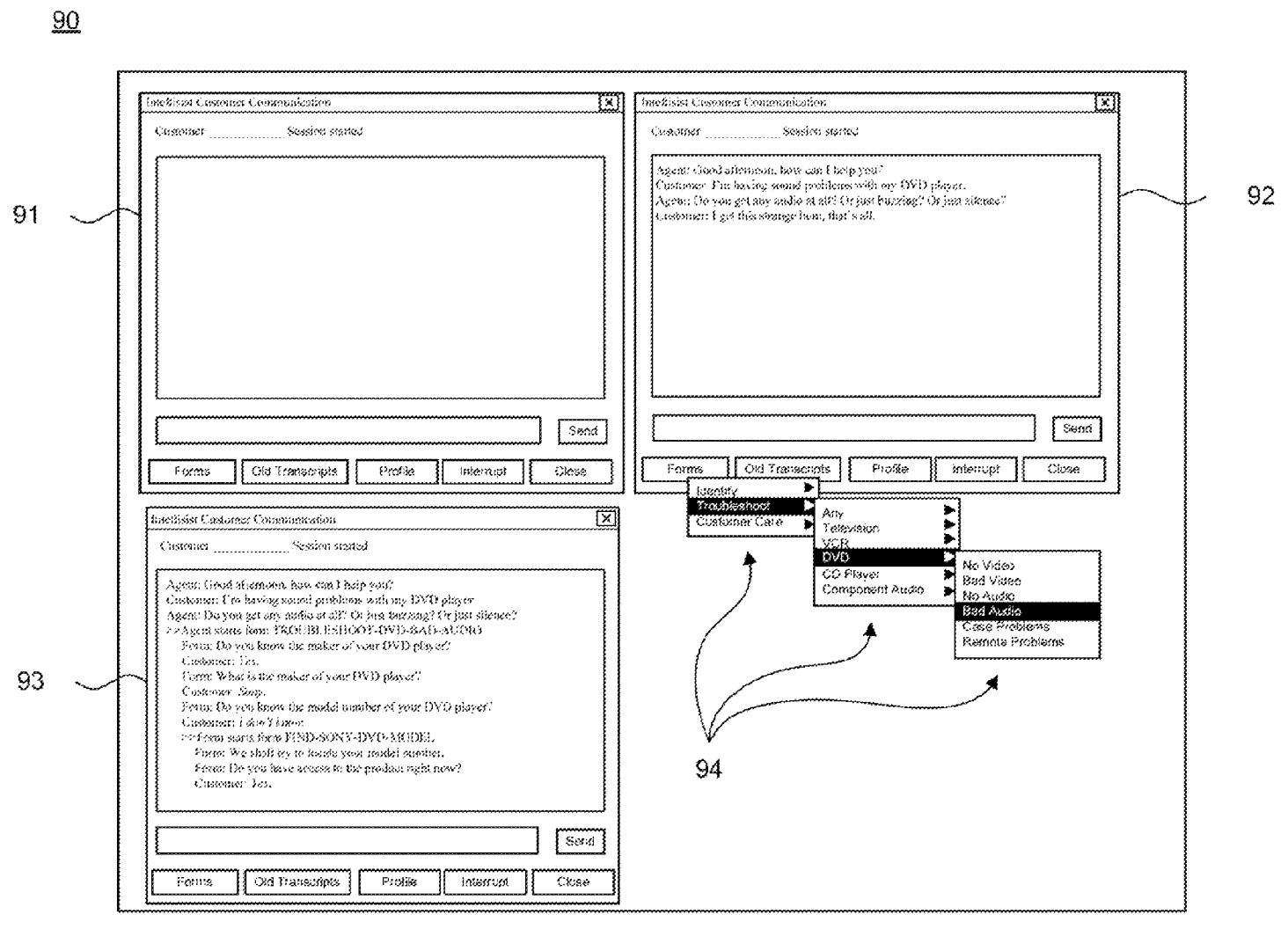

Each agent application 43 implements a graphical user interface (GUI) for the human agent. FIG. 7A is a screen shot showing, by way of example, a set of call center service windows 91, 92, 93 generated by the system 10 of FIG. 1. Each call center service window 91, 92, 93 appears in a graphical user interface 90 and enables an agent to indirectly interact with a customer calling through the telephony interface 35. Following sign-on, via the agent application 43, an agent can accept new session requests from the messaging server 31 and create a visual session container for each session.

In the described embodiment, up to four sessions can be presented to an agent simultaneously. Preferably, the agent can view the contents of all sessions on a single screen. One session is designated as the active session and accepts agent commands, such as an instruction to listen to a transcribed user message, play a synthesized agent message to the customer, or activate a script through a menu 94, as further described below with reference to FIG. 6. The agent can switch active sessions with a single keystroke or pointer click.

Figure 7B:
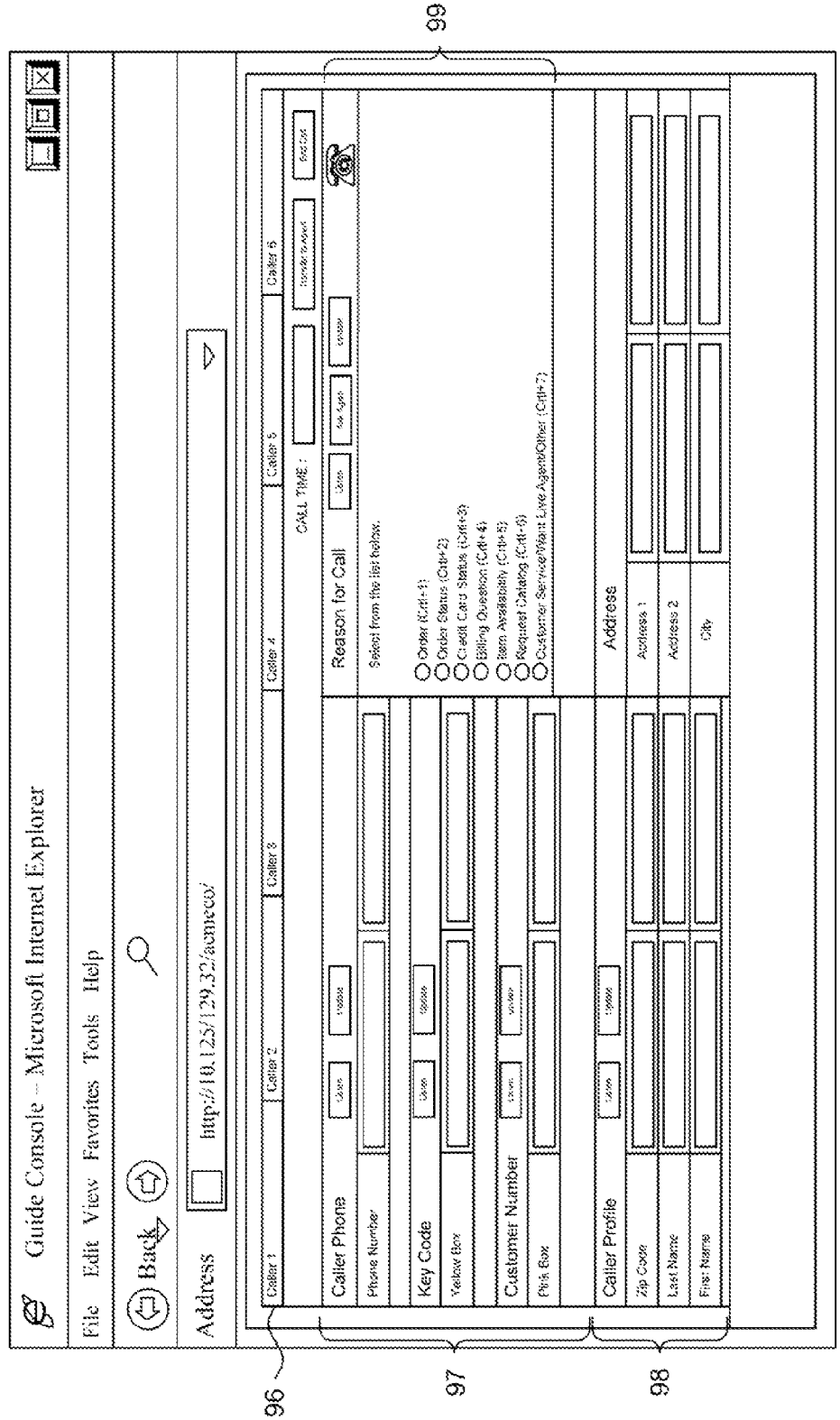
FIG. 7B is a screen shot showing, by way of example, a single call center service window with multiple call tabs, generated by the system of FIG. 1.

The multiple call sessions can also be displayed one at a time in the user graphical interface. FIG. 7B is a screen shot showing, by way of example, a single call center service window 95 with multiple call tabs, generated by the system 10 of FIG. 1. The call center service window 95 is displayed in a graphical user interface to enable an agent to communicate with a customer. Multiple call tabs 96 are located near the top of the window 95 to indicate multiple active call sessions. Each call session can be identified by a corresponding customer name, phone number, or identification number, as well as by other identifiers. The call session identifiers can be displayed in the call tabs. Each call center service window 95 also includes caller identification fields 97, a caller profile 98, and a reason for the call 99. To navigate to a different call center service window from the window 95 displayed, the agent can select the appropriate call tab 96 corresponding to the call session.

Referring back to FIG. 3A, each agent application 43 receives a stream of transcribed speech utterances from the telephony interface 35 via the messaging server 31. In an alternate embodiment (not shown), the stream of transcribed speech utterances bypasses the messaging server 31 and is received directly from the telephony interface 35. The messaging server 31 communicates with the speech recognition engine 36 to transcribe the utterances before sending the transcribed utterances to the agent application 43. In turn, the agent application 43 sends agent messages to the telephony interface 35 via the messaging server 31. The messaging server 31 communicates with the text-to-speech engine 37 to convert an agent message into a stream of synthesized speech utterances prior to forwarding to the telephony interface 35.

Figure 4:
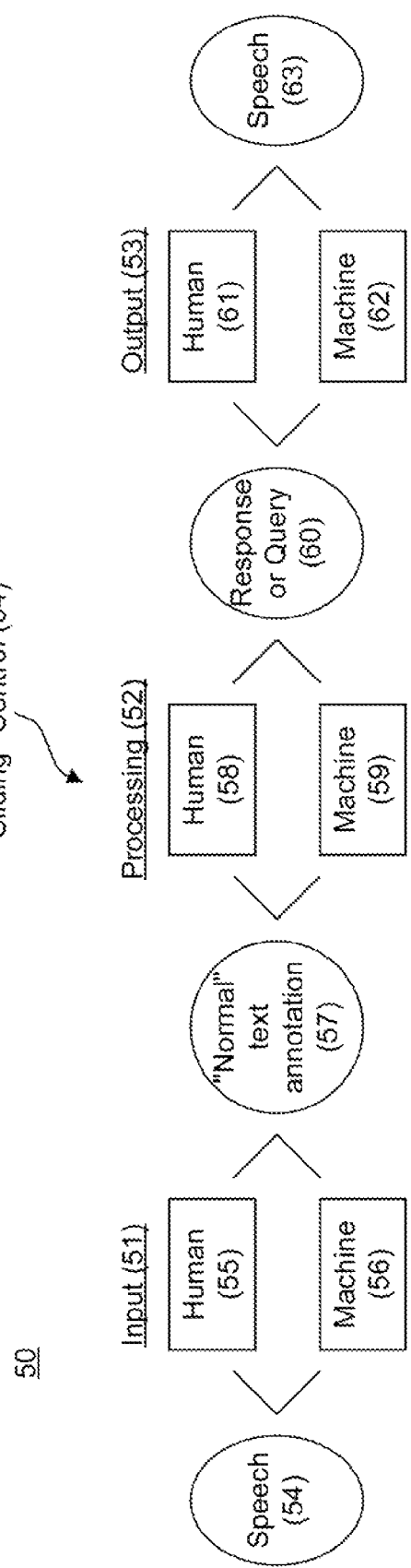
FIG. 4 is a process flow diagram showing variable automation levels provided using the system of FIG. 3A.

FIG. 4 is a process flow diagram showing variable automation levels 50 provided using the system 30 of FIG. 3A. A typical caller sequence proceeds in three stages: input 51, processing 52, and output 53. During the processing stage 52, the system 30 provides each agent with a "sliding" control 64 that can vary the level of automation used in customer service provisioning. At one end of the sliding control 64, the agent must manually type each written response to a user inquiry and, at the other end, the system 30 directly carries out customer interactions in a fully-automated fashion.

The sliding control 64 accommodates the need to provide linear and non-linear processing to flexibly and dynamically tailor call transaction processing. Non-linear processing occurs when a caller departs from an expected course of action, such as by providing a tangential response to a question in a script requesting specific information. The agent would read the user message and alter the course of script processing to accommodate the tangential response, thereby enhancing the comfort level of the customer towards problem resolution. Linear processing occurs when the system 30 interacts directly with the caller through pre-defined scripts and is able to successfully complete a series of steps towards problem resolution along a pre-defined course of action. During a course of a call, both linear and non-linear processing can be used strategically to increase user confidence level and to sufficiently process a larger volume of caller traffic than possible with a fully manual and fully non-linear call processing approach.

During the input stage 51, speech 54 is received into the automated call center 11 (shown in FIG. 1), either by a human operator 55 or a machine 56, such as the MPACT system 30. The speech 54 is converted into a stream of transcribed speech utterances or "normal" text annotations 57. The text annotations 57 are machine-processable as inputs to the processing stage 52. A message manager (not shown) associates incoming the audible speech utterances with the text annotations 57 and the associated incoming audible speech utterances are provided with the text annotations 57 to the agent for optional playback.

Processing generally involves the execution of some form of action, such as a script execution, as further described below with reference to FIG. 5. During the processing stage 52, either a human operator 58, that is, an agent, or a machine 59 interprets each annotation 57 and generates a response or query 60. The response or query 60 is received in the output stage 53, either by a human operator 61, that is, an agent, or a machine 62. Finally, the response or query 60 is formed into synthesized speech utterances 63 that are played back to the caller.

In the described embodiment, the three stages of call processing, input 51, processing 52, and output 53, are performed by machines 56, 59, 62, although adjunctive processing can be performed by human operators 55, 58, 61, as necessary to supplement the MPACT system 30. Thus, a sliding control 64 of human operator and machine interaction can be provided to automate call center operations. Using the sliding control 64, the agent can change the behavior of the script engine 32 (shown in FIG. 3A) by beginning execution of a script 29, adjusting the point of execution within a script 29, or by causing a portion of the script 29 to be repeated. The agent can thereby alter the ordinarily sequential control flow of script processing by intervening as necessary, based on the current context of the call, or can allow script processing to proceed in a linear fashion.

In addition to indirect communication via an agent console 39, each agent can also accept live calls from customers directly through the telephony interface 35 in a real time, voice-to-voice mode. Live call processing may be required to handle crises or other service needs that are not amenable to automation, or to provide those services to customers, which are not generally acceptable when provided via automation.

In a further embodiment, the agent communicates with callers executing on client systems 18 through text message exchange transacted over the internetwork 17, or other data transmission means. Unlike conventional chat sessions, caller processing is transacted in the same manner in which telephonic calls received through the telephony interface 35 are transacted. Consequently, the agent can apply the sliding control 64 over automation level to ensure a continuum of non-linear to linear call processing independent of the actual call transmission means. Various arrangements and combinations of call transmission means can therefore be accommodated, as would be recognized by one skilled in the art.

Referring back to FIG. 3A, as a first step, an agent, via an agent console 39, authenticates to the messaging server 31 prior to logging on. Following log-on, the agent indicates availability to handling calls by signing on to the messaging server 31. Thereafter, calls that have been accepted into the automated call center 11 (shown in FIG. 1) are assigned to a session, and the session is subsequently assigned to a signed-on agent.

After the initial communication between the agent and the customer, an agent application 43 ordinarily loads a script describing the session flow from the application database 45, either according to agent instructions or based on information provided by the telephony interface 35, such as Caller ID. The agent application 43 communicates further via the messaging server 31 with the speech recognition engine 36 and text-to-speech engine 37 to transcribe text-to-speech and convert speech-to-text, as necessary. Communication between the agent application 49 and the speech recognition engine 36 and text-to-speech engine 37 continues until the call terminates.

Figure 5:
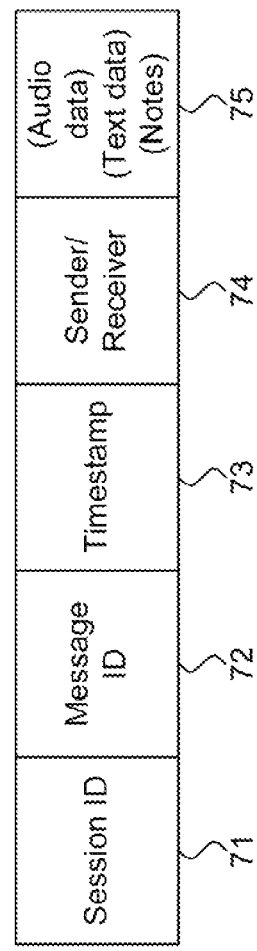
FIG. 5 is a block diagram showing a schema for storing records in the logging database of the system of FIG. 3A.

FIG. 5 is a block diagram showing a schema 70 for storing records in the log database 44 of the MPACT system 30 of FIG. 3A. Each session is identified by a session identifier (ID) 71, which uniquely identifies each session, such as a sequentially-increasing number. In addition, each record contains a message identifier (ID) 72, time stamped 73, sender or receiver flag 74, and content 75, typically constituting audio data, text data or notes transcribed by the agent. Other types of identifiers, formation and content can be stored in a record, as would be recognized by one skilled in the art.

Referring back to FIG. 3A, each agent application 43 also contains a supervisor mode that can be used to manually monitor system behavior and performance, control agent application 43 and messaging server 31 operation, monitor and guide human agents actions, and perform similar administrative tasks. A separate administrator application (not shown) enables system setup and configuration.

Finally, each agent application 43 can execute scripts 49 to perform a pre-defined sequence of instructions, generally consisting of question-and-response dialogues through which a customer is queried regarding a concern or to troubleshoot a problem. FIG. 6 is a process flow diagram showing, by way of example, the control flow 80 followed in processing a script 49 using the system 30 of FIG. 3A. During the initial stage of processing, a customer 82 indirectly interacts with an agent 81 through the execution of an initial script 83. The purpose of the initial script 83 is to populate a standard form 84 with general information regarding the nature of the call. Upon reviewing the form 84, the agent 81 executes, via the agent application 43, one or more additional scripts 87 to provide problem resolution or troubleshooting and to receive further information via additional forms 88. Finally, the agent, via the agent application 43, generates a resolution form 86 that is used as parameters to a closing script 85, which is executed for playback to the customer 82 to complete the call.

In the described embodiment, each form 84, 86, 88 is structured as a data containment object that stores data relevant to the agent application 43. Preferably, each data containment object is maintained as a binary large object (BLOB) interpretable by each agent application 43 based on business requirements. Significantly, the use of scripts, forms and agent interaction enables a non-linear execution path through problem resolution and troubleshooting. As necessary, an agent, through the agent application 43, can manually enter data into a form and progressively modify the sequence of problem resolution and troubleshooting. The amount of manual agent intervention follows from the sliding control 64 implemented in the MPACT system 30, as described above with reference to FIG. 4.

Referring back to FIG. 3A, the script engine 32 executes each script 49, which incorporate the grammar 33. By way of example, a sample grammar for use in the described embodiment is provided in Appendix A. Other forms of grammars and scripting languages could be used, as would be recognized by one skilled in the art.

Resource Manager

The resource manager 40 provides scalability, load balancing and redundancy in large systems comprising multiple speech recognition engines 36, text-to-speech engines 37, and telephony interfaces 35. In the described embodiment, the messaging server 31 has a built-in simple resource manager 40 (not shown) to manage multiple agent applications 43 operating in smaller call capacity systems.

Using an administration application that controls the resource manager 40, an administrator can set and configure the system while operational. The resource manager 40 enables the administrator to add or remove servers and to reroute connections between different components, for instance, between telephony interface 35, messaging server 31 and agent application 43.

Audio Cache

The audio cache 38 provides a centralized repository in which pre-recorded "canned" sound bites are stored for efficient playback. These sound bites provide both informational and navigational messages to all callers and standardized synthesized speech utterances for use in scripts and repetitive agent actions. The sound bites in the audio cache 38 are retrievable by the telephony interface 35, text-to-speech engine 37 and agent application 43.

System Configuration and Capacity

In a typical system, different components run on separate machines. A typical medium-sized system consists of one server running a telephony interface 35 and messaging server 31, a separate server for the speech recognition engine 36, another server for the text-to-speech engine 37, and a fourth server for the log, agent profile, and agent application databases 44, 45, 46, respectively. Alternatively, a minimal system runs all the components on a single server, along with an agent application 43 on an integrated agent console 39.

In the described embodiment, each medium-sized system configuration is "24×6," meaning that the system can handle 24 simultaneous calls and can interface with six human agents. A minimal system configuration is "4×1," that is, four simultaneous calls with one human agent, while a large system configuration is "96×24," that is, 96 simultaneous calls and 24 human agents. Through the resource manager 40, an aggregation of the above-described configurations enables much larger call capacity systems.

By mixing proprietary technologies and existing systems, the MPACT system 30 reduces the average call time by 30%, increases agent efficiency up to four-fold, and significantly improves customer satisfaction.

Method for Providing a Message-Based Communications Infrastructure

Figure 8:
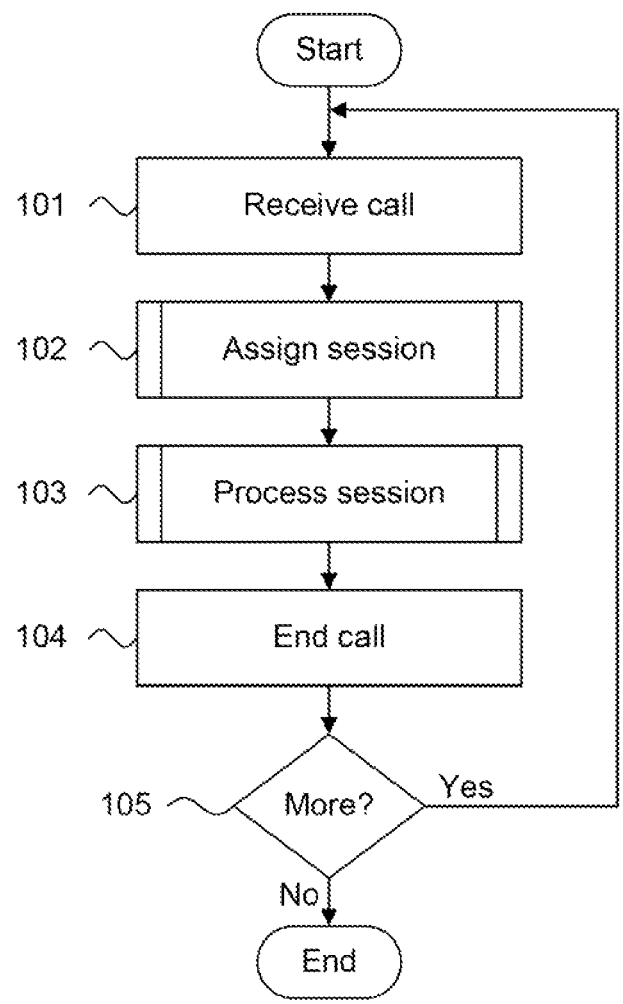
FIG. 8 is a flow diagram showing a method for providing a message-based communications infrastructure for automated call center operation, in accordance with one embodiment.

FIG. 8 is a flow diagram showing a method for providing a message-based communications infrastructure 100 for automated call center operation, in accordance with the present invention. The method is executed by the MPACT system 30 and individual operations are executed by the various components, specifically described below. During regular operation, the MPACT system 30 processes multiple simultaneous calls, which are handled by one or more agents executing agent applications 43 on an agent console 39 (shown in FIG. 1).

Generally, the method 100 proceeds by iteratively processing each call in a continuous processing cycle. During each cycle, a call is received (block 101) and assigned to a session (block 102) by the session manager 47 (shown in FIG. 3A), as further described below with reference to FIG. 9. Next, the session is processed (block 103), as further described below with reference to FIG. 10. Following session processing, the call ends (block 104) and further call are processed (block 105) until the MPACT system 30 is shut down or no further calls are received. The method then terminates. In the described embodiment, the MPACT is a multi-threaded system, employing multiple threads, which each independently execute the method 100.

Figure 9:
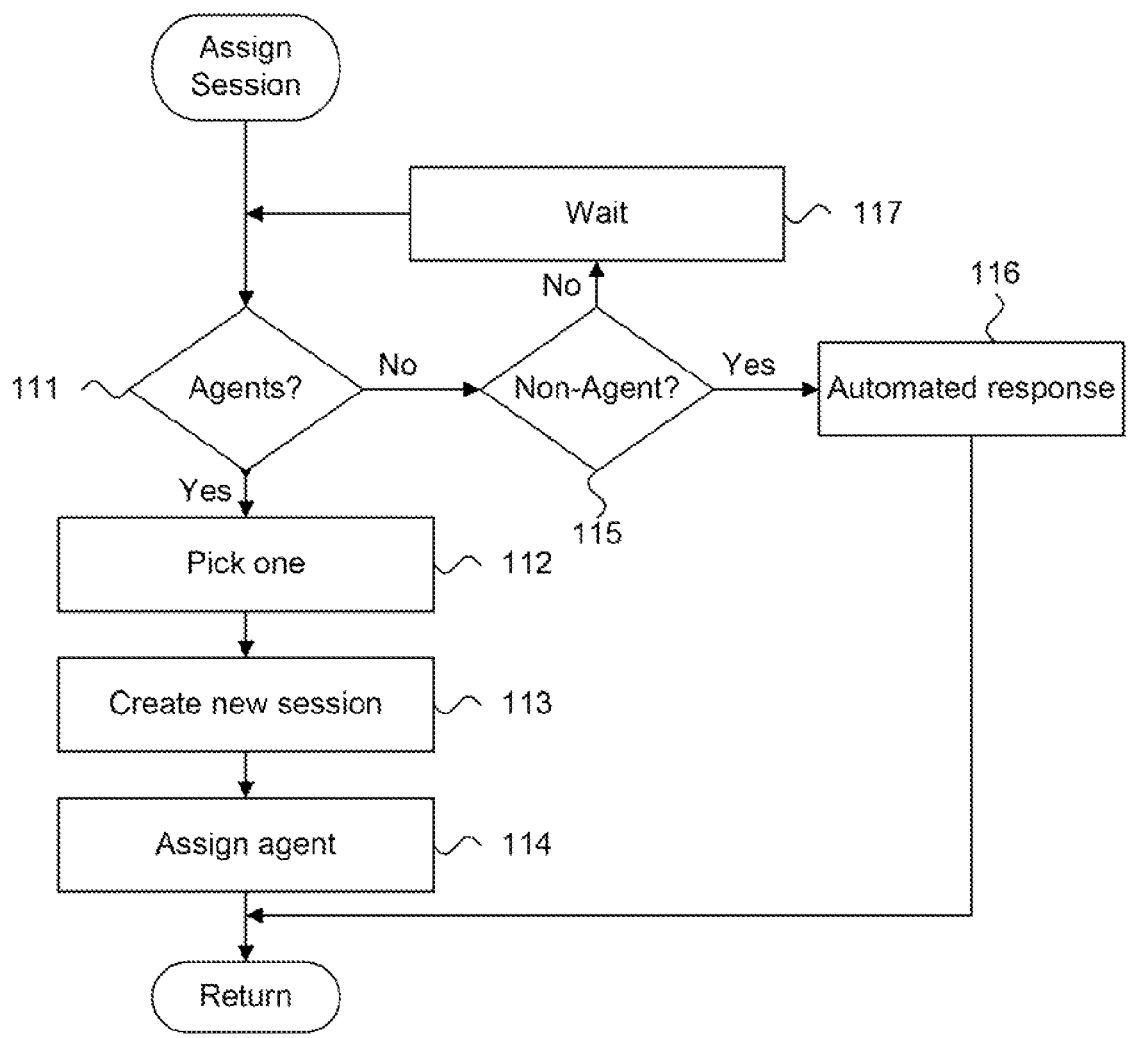
FIG. 9 is a flow diagram showing a routine for assigning a session for use in the method of FIG. 8.

FIG. 9 is a flow diagram showing a routine for signing a session 110 for use in the method 100 of FIG. 8. The purpose of the routine is to instantiate a new session object for processing by an agent application 43 (shown in FIG. 3A) and to subsequently assign the instantiated session to an agent operating on an agent console 39.

Initially, if any agent is available (block 111), one of the agents is picked as the assigned agent (block 112) and the new session is created (block 113). Subsequently, the selected agent is assigned to the newly-created session (block 114). The routine then returns. If no agents are available (block 111), the customer is presented with the option of interfacing to a non-agent (block 115), that is, an automated voice response system, which provides the information specifically requested by the customer (block 116), after which the routine returns. Otherwise, if the customer prefers an agent (block 115), the customer enters into a waiting queue (block 117) until an agent becomes available.

Note that both the customers and agents can be prioritized using predefined selection criteria. For instance, customers who have enrolled in premium support service can received a higher priority in the waiting queue than other customers. As well, specialized problem-resolution agents can be prioritized for servicing particular customer needs for consideration during selection of agent assignment.

Figure 10:
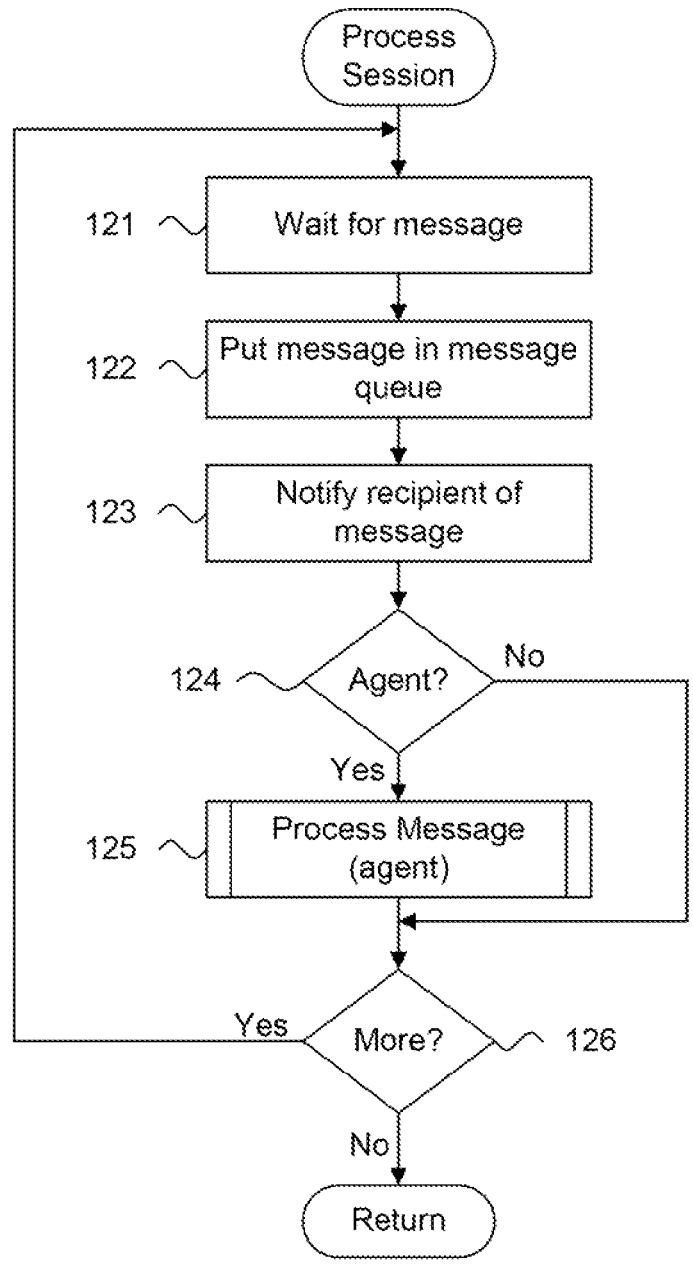
FIG. 10 is a flow diagram showing a routine for processing a session for use in the method of FIG. 8.

FIG. 10 is a flow diagram showing a routine 125 for processing a session 120 for use in the method 100 of FIG. 8. The purpose of the routine is to iteratively store and forward messages using the message queue 48 (shown in FIG. 3A). Other forms of queueing and message handling and prioritization are possible, as would be recognized by one skilled in the art.

During each iteration, the session manger 47 (shown in FIG. 3A) waits for a message, either a user message or agent message (block 121). Upon receipt, the message is placed in the message queue 48 (block 122) and the recipient of the message is notified (block 123). If the message is a user message being sent to an agent (block 124), the message is processed by the agent assigned to the session to which the user message corresponds (block 125), as further described below with reference to FIG. 11. Iterative processing continues with each subsequent message (block 126), after which the routine returns.

Figure 11:
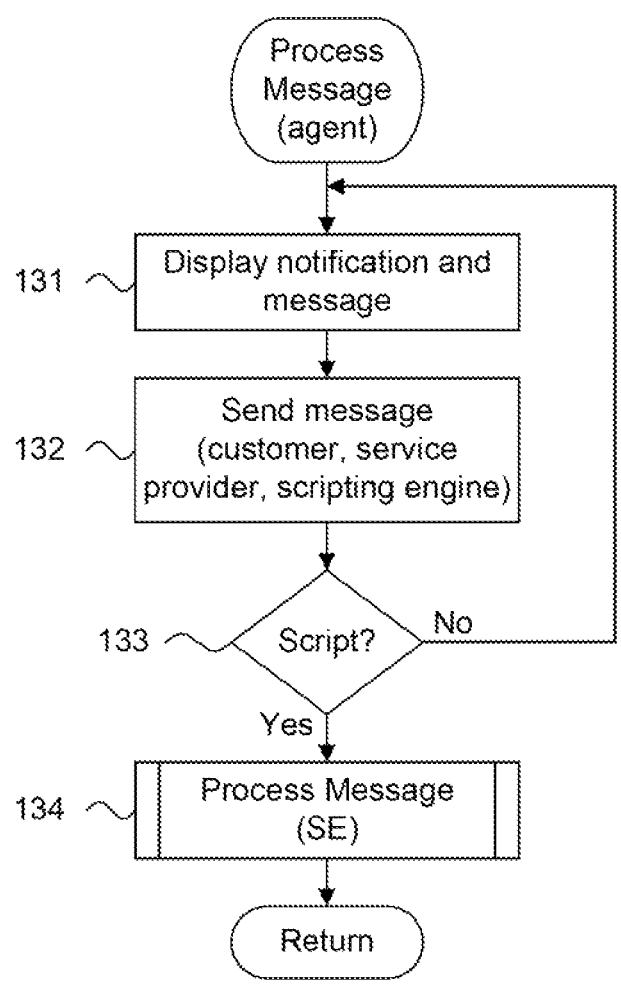
FIG. 11 is a flow diagram showing a routine for processing a session by an agent for use in the routine of FIG. 10.

FIG. 11 is a flow diagram showing a routine for processing a session by an agent 130 for use in the routine 125 of FIG. 10. The purpose of the routine is to facilitate the interaction between an agent and customer though an agent application executing on an agent console 39 (shown in FIG. 3A).

First, the notification message is displayed (block 131) on the graphical user interface 90 (shown in FIG. 7) of the agent application 43. As necessary, the agent sends agent messages to the customer from service provider or script engine 32 (shown in FIG. 3A) to provide appropriate handling of the user message (block 132). If the sent message consists of a request to execute a script 49 (block 132), the message is further processed by the script engine 32 (block 134), as further described below with reference to FIG. 12. The routine then returns.

Figure 12:
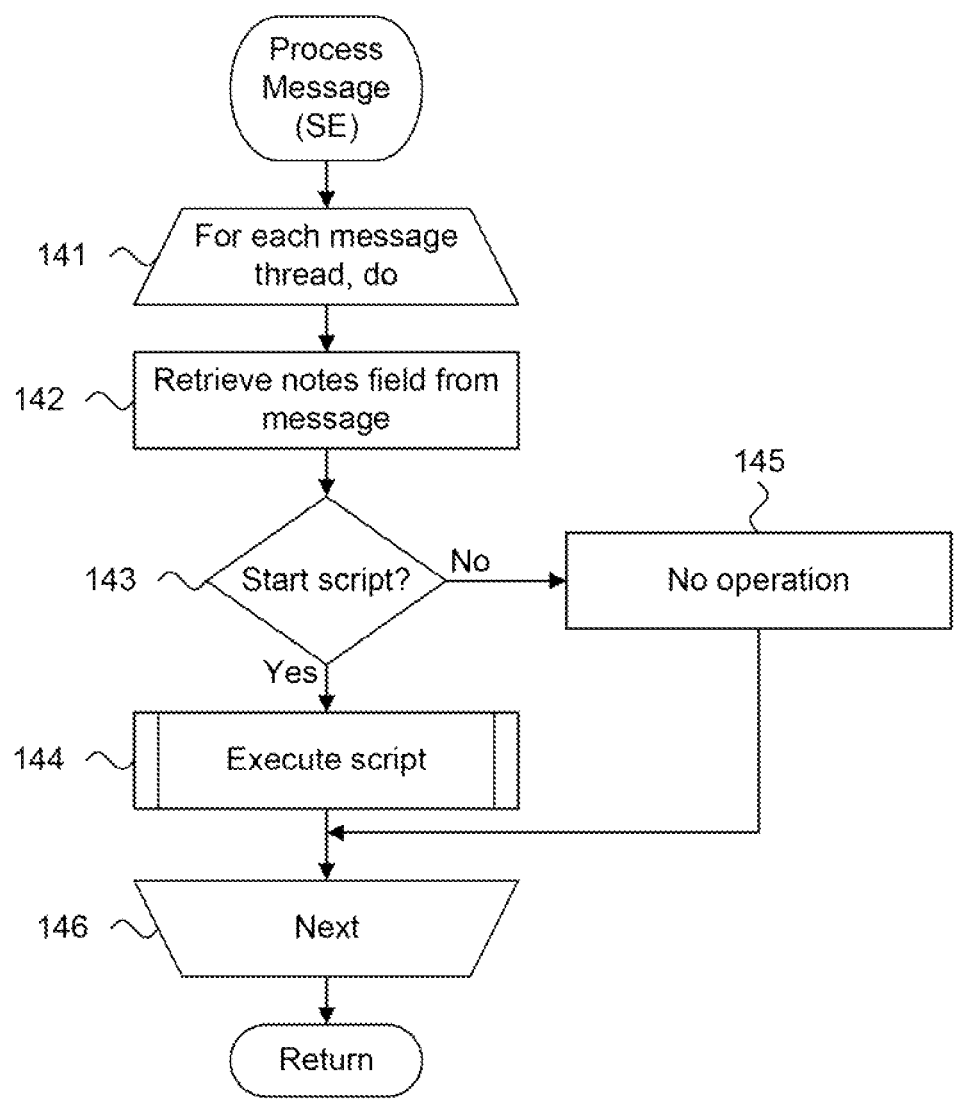
FIG. 12 is a flow diagram showing a routine for processing a session by a script engine for use in the routine of FIG. 11.

FIG. 12 is a flow diagram showing a routine for processing a session by a script engine 140 for use in the routine 130 of FIG. 11. The purpose of this routine is to iteratively process each script execution request using the script engine 32 on behalf of requesting agent applications 43 (shown in FIG. 3A).

Each message thread is iteratively processed (blocks 141-146) as follows. During each iteration (block 141), the notes field of each message is retrieved (block 142) and, if a script execution request is found (block 143), a script 49 is executed (block 144), as further described below with reference to FIG. 13. Otherwise, if no script request is present (block 143), no operation occurs (block 145). Processing continues with each additional message thread (block 146), after which the routine returns.

Although described above with reference to the linear processing of a script in sequential order, agent intervention in script processing is fully supported. The agent continues to monitor the progress of the script execution by observing user responses and can intervene as necessary to accommodate a non-scripted response. For example, the user may provide a tangential response to a question in the script requesting specific information. The agent would read the user message and alter the course of script processing to accommodate the tangential response to the sliding control 64 (shown in FIG. 4).

Figure 13:
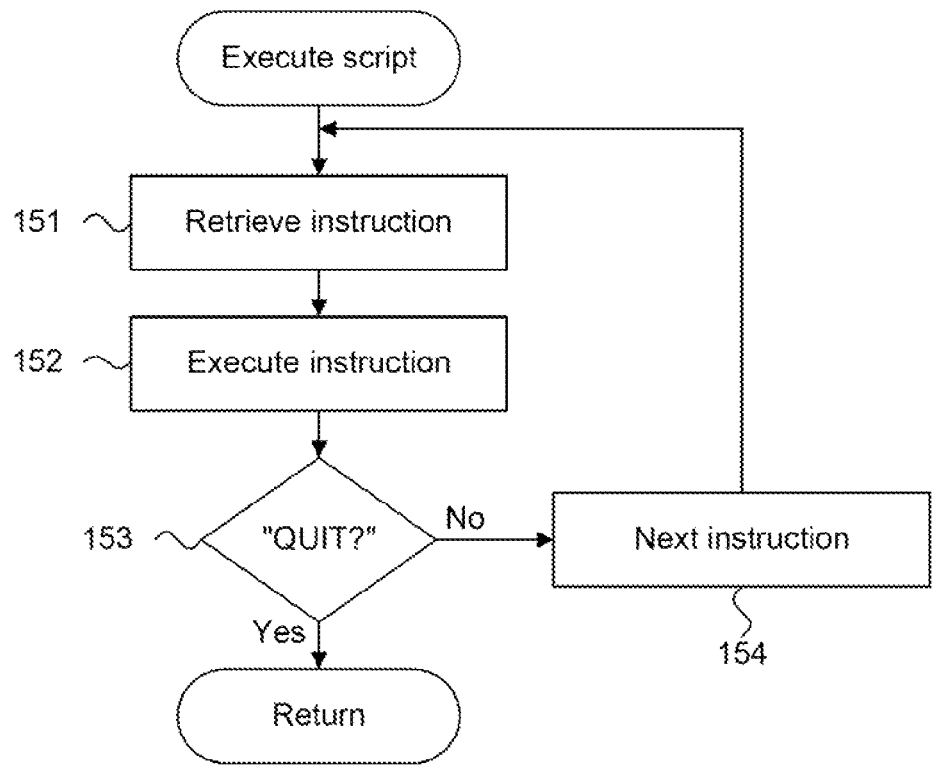
FIG. 13 is a flow diagram showing a routine for executing a script for use in the routine of FIG. 12.

FIG. 13 is a flow diagram showing a routine for executing a script 150 for use in the routine 140 of FIG. 12. The purpose of this routine is to perform standard retrieve-and-interpret script instruction execution, as is known in the art.

First, each instruction is retrieved (block 151) and executed (block 152). In the described embodiment, instruction execution follows from an interpretable stored grammar 33 (shown in FIG. 3A) and as provided, by way of example, in Appendix A. If the executing instruction is a "Quit" instruction (block 153), the script execution terminates and the routine returns. Otherwise, script processing continues with the next instruction (block 154).

Figure 14:
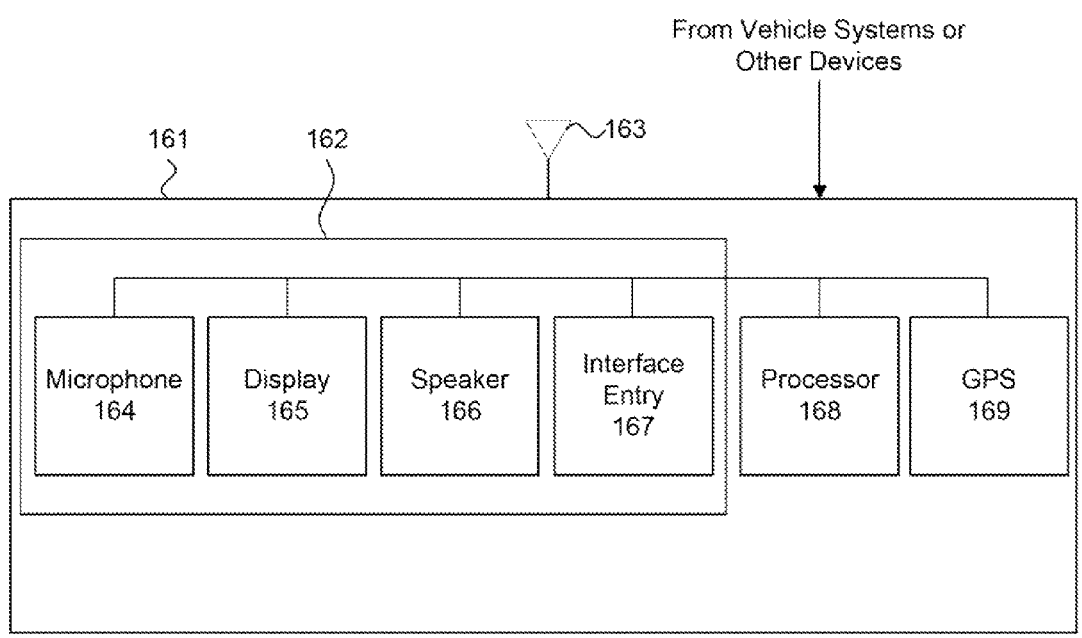
FIG. 14 is a block diagram showing a mobile messaging system for presenting output data, in accordance with a further embodiment.
Figure 15:
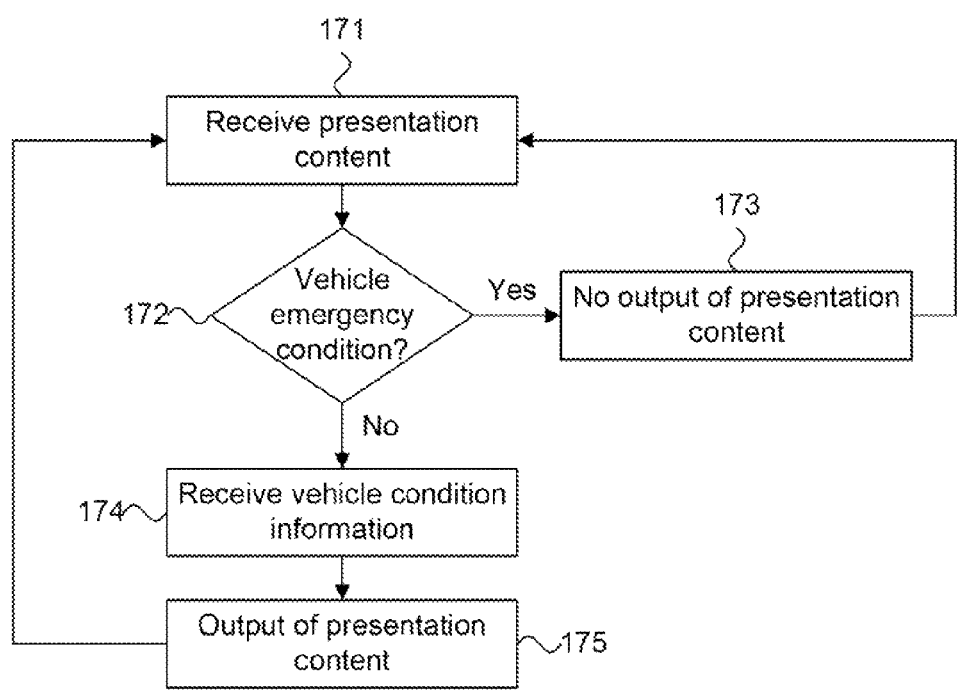
FIG. 15 is a flow chart diagram showing a routine for presenting output data using the mobile messaging system of FIG. 14.

The automated call center can also be helpful to mobile users to provide directions, event information, and assistance, as well as to perform concierge and other services for the mobile user. FIG. 14 is a block diagram showing a mobile messaging system for presenting output data, in accordance with a further embodiment. The mobile messaging system (MMS) 161 can include a user interface 162 having a microphone 164 for capturing the user's voice; a display 165; speakers 166; and an interface entry 167 for allowing the user to perform various interactive functions. The MMS 161 also includes a processor 168; a global positioning system (GPS) 169 for determining precise vehicle locations; and a communications device 163, such as a cellular modem, for transmitting and receiving wireless information. The MMS 161 is also coupled to receive information from other vehicle systems (not shown), such as a speedometer, an engine, or a braking system. FIG. 15 is a flow chart diagram showing a method for presenting output data using the system of FIG. 14. The processor 168 of the MMS 161 receives presentation content (block 171). The presentation content is preferably received by the communications device 163 from a server transmitted over a network (not shown). The processor 168 determines if any vehicle emergency condition exists for a vehicle (block 172) based on information received from vehicle systems other than the MMS. If the processor 168 determines that a vehicle emergency condition exists, the processor 168 stops all output of received presentation content (block 173) to any one of the components of the user interface 162. Examples of a vehicle emergency condition that can cause the processor to stop output of the presentation content to the user interface 162 are signals received from the engine that indicate engine overheating or a signal that indicates the driver of the vehicle has applied brakes to the point where an anti-braking system is activated. After the output is stopped, the processor 168 can again receive presentation content (block 171).

If the processor 168 determines that there is not a vehicle emergency condition, the processor 168 receives vehicle condition information (block 174). The vehicle condition information comes from a number of sources that generate signals, such as a GPS 169 or speedometer. The processor 168 outputs the presentation content through the user interface 162 based on the vehicle condition information (block 175). The substance and format of the presentation content displayed on the display 165 or broadcast on the speakers system 166 of the user interface 162 is determined. For example, when the vehicle is parked, the processor 138 presents all or nearly all of the received presentation content. As the vehicle condition changes, for example, by increasing speed, the processor 138 changes the presentation of the content information shown on the display 165.

The change in presentation content can also involve shifting the presentation of the information from a visual display to an audio broadcast, as output through the speakers 166. In a further example, the presented content includes a full detailed map of the vehicle's location with directions to a previously requested destination. Based on the vehicle speed, or the rate of change of the vehicle speed or direction, the detail of the presented content shown on the map can be altered. As the vehicle speed increases, the detail shown on the map is reduced, for example, to include only the vehicle's present location in relation to nearby streets and intersections. Some or all of the presentation content, or map directions, may be translated to an audio format and broadcast to the vehicle operator via the speakers 166. In other examples, the size and font of the text, icons, and graphics presented on the display can be altered as the vehicle condition changes, as described with further reference to FIG. 16. Audio outputs can also be altered, such as by an increase or decrease in audio broadcast based on a change in the vehicle condition. After presenting the output, the processor 168 returns to receiving additional presentation content (block 171). The presentation content can be processed in real-time from the time the content is received over the network by the server to the output of the presentation content to a vehicle operator through the user interface 162. In a further embodiment, the presentation content can be received at one time and stored by the processor 168 before any determination is made of how to present the output. In a still further embodiment, a person other than the vehicle operator can view the presentation content based on a set level of detail.

Figure 16:
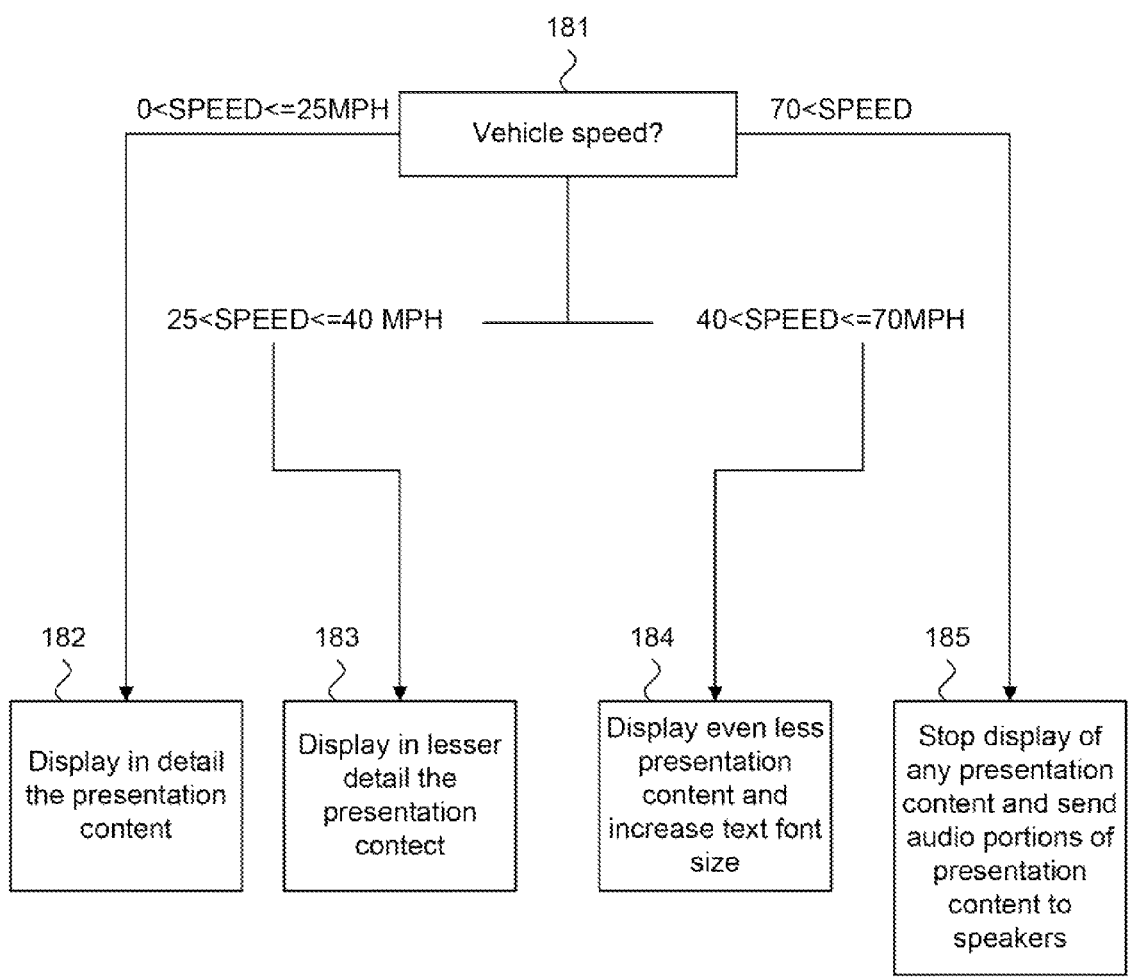
FIG. 16 is a flow chart diagram showing a routine for displaying presentation content based on a vehicle condition.

FIG. 16 is a flow chart diagram showing a routine for displaying presentation content based on a vehicle condition. The speed of a vehicle is determined (block 181), for example, by reference to the vehicle speedometer. If the vehicle's speed is less than or equal to 25 miles per hour (mph), the processor 168 generates a detailed display of the presentation content on the display 165 of the user interface 162 (block 182). As the speed of the vehicle increases, the amount of detailed visual information generated for display is reduced. Thus, if the vehicle speed is greater than 25 mph but less than or equal to 40 mph, the processor 168 generates a display of the presentation content with less visual information (block 183) than was generated for the display corresponding to vehicle speeds of less than or equal to 25 mph. When the speed is greater than 40 mph but less than or equal to 70 mph, the processor 168 reduces the amount of detail of the presentation content to be displayed on the display 165, by increasing the font size of the text included in the displayed presentation content and changing the color of the text (block 184). The increased font size and color change provides a display that is easily viewable to the user at high speeds. When the speed is greater than 70 mph, the processor 168 stops generating display information for presentation on the display 165 and switches to a pure audio presentation for output over the speakers 166 (block 185). The specific speed ranges described are used only as an example and should not be construed as limiting. The exact trigger speeds can vary according to various factors, such as road conditions, vehicle specification, or vehicle operator skill, as well as user preferences. Likewise, the output format of the presentation content may be varied according to user interface hardware or software constraints, as well as user preferences.

In addition to the vehicle example described above, the presentation content can be automatically adjusted based upon one or more vehicle conditions related to a rate of change in vehicle speed, rate of change in vehicle direction, cellular phone or headphone activation, radar detector activation, noise level decibels above a certain value, radio or compact disc usage, television or video disc usage, and turn signals as well as other conditions. The vehicle conditions can be determined by vehicle systems, such as the vehicle speedometer, steering system, engine, braking system, and acceleration system. The vehicle systems can also include additional components, such as a temperature gauge, humidity gauge, wind speed gauge, precipitation gauge, compass, and clock. These additional vehicle system components can be integrated with or separate from the MMS 161, so long as they are capable of being monitored by the MMS 161.

Other vehicle conditions, vehicle systems, and components are possible.

Output of the presentation content can be automatically adjusted based upon one of the vehicle conditions or a combination of the vehicle conditions. For example, the MMS 161 monitors vehicle braking and acceleration systems with reference to an internal clock to determine the rate of change of the vehicle's speed. If the vehicle speed is increasing or decreasing rapidly, the MMS 161 automatically reduces the amount of detail provided in visual presentation content, and can transfer some or all of the presentation content to an audio presentation. In another example, the MMS 161 monitors the movement of the steering wheel and vehicle direction with reference to a compass and a clock to determine a rate of change of the vehicle direction. If the vehicle direction is changing rapidly, the MMS 161 can automatically reduce the amount of detail provided in the visual presentation content, as well as transfer some or all of the presentation content to an audio presentation.

Figure 17:
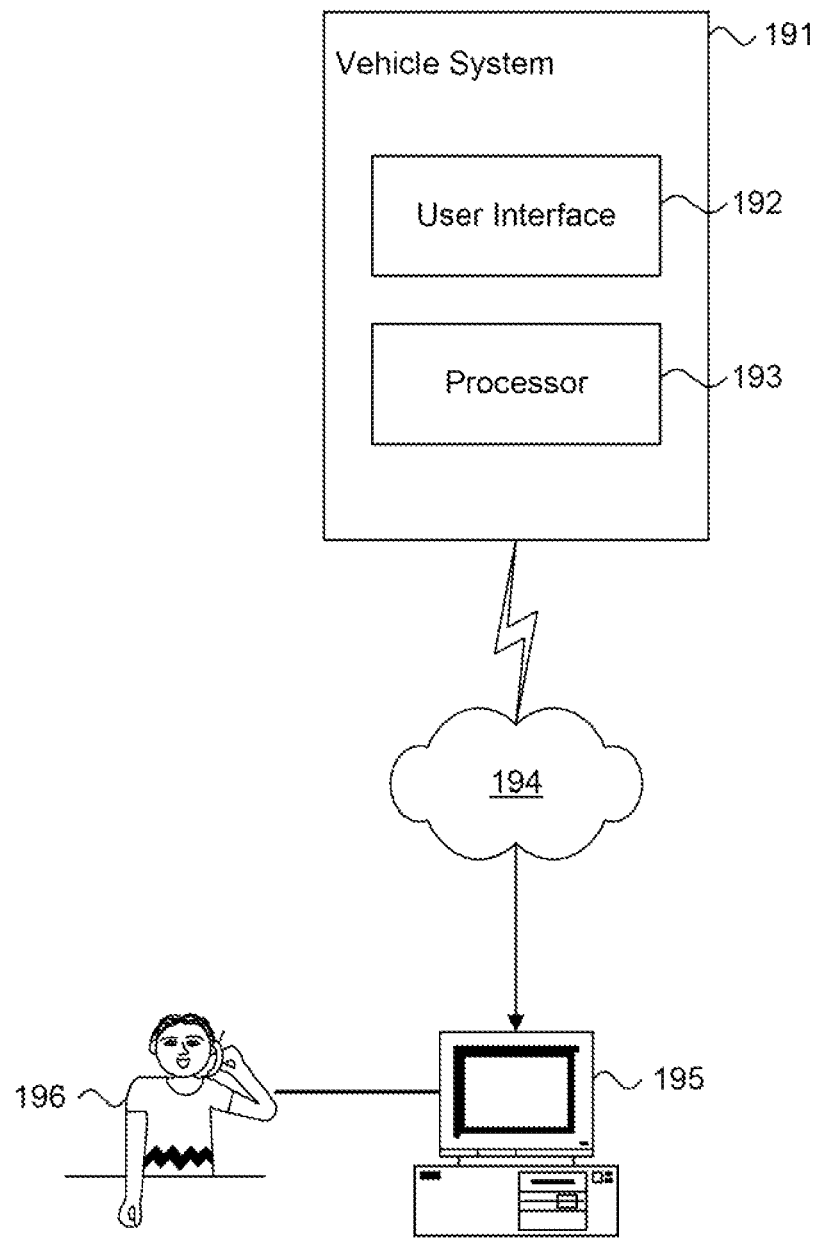
FIG. 17 is a block diagram showing a vehicle system for communicating with the system of FIG. 3A.

FIG. 17 is a block diagram showing a vehicle system for communicating with the system of FIG. 3A. The vehicle system 191 includes a user interface 192 and a processor 193. The user interface 192 includes a microphone that receives voice instructions from a user and sends the instructions to the processor 193. The processor 193 performs voice processing of the received voice signals and outputs the processed voice signals over a speaker system or a visual display via the user interface 192. The processor 193 can also send the processed voice signals over a wireless network 194 to an operator 196 at an operator system 195.

Figure 18:
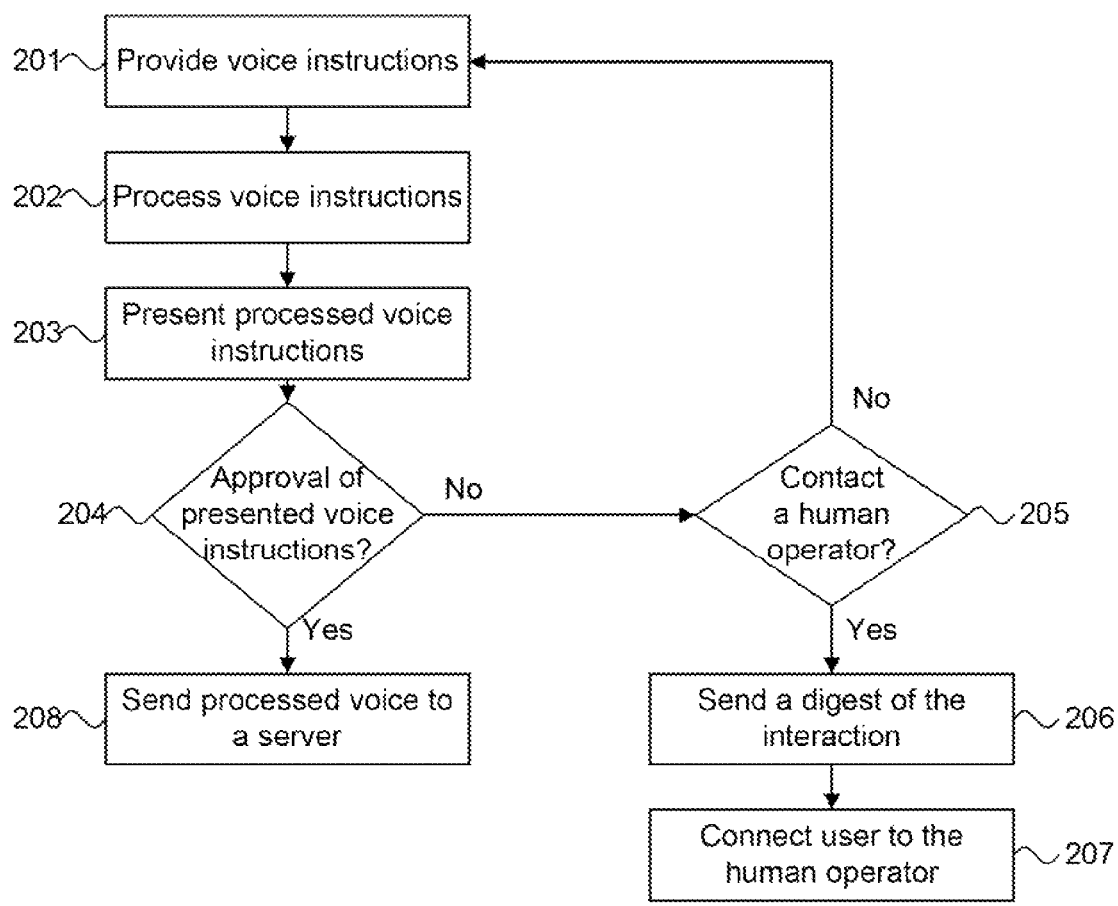
FIG. 18 is a flow chart diagram showing a method for communicating with the system of FIG. 3A using the vehicle system of FIG. 17.

FIG. 18 is a flow chart diagram showing a method for communicating with the system of FIG. 3A. First, a user inputs voice instructions (block 201) into the vehicle system 191 via the user interface 192. Next, the processor 193 performs voice recognition processing (block 202) on the received voice instructions to determine the content of the instructions. Results from the voice recognition processing is presented to the user (block 203) via the user interface 192 in the form of verbal communication over a speaker system or text messaging on a visual display. The user can determine whether the voice instructions were correctly interpreted (block 204). If the processor 193 has interpreted the inputted voice instructions properly, the user can instruct the vehicle system 191 to send the processed instructions to a predefined destination, such as a server (block 208). Other destinations are possible. Otherwise, the user has an opportunity to contact a human operator to make sure the instructions are properly entered (block 205). If the user decides to contact the human operator, a digest of the interaction between the user and the processor 193 is sent to a human operator 196 (block 206) at an operator system 195. The user is connected to the human operator (block 206), who is tending the operator system 195, including a phone and a computer terminal. The user and the human operator resolve the content of the user-initiated instructions. If the user does not want to be connected to a human operator, the user can return to providing new voice instructions (block 201).

In a further embodiment, the processor 193 processes a new voice instruction based on a same or similar voice instruction that was previously recorded. For example, on five previous episodes, the user provided a certain voice instruction about a restaurant. The processor 193 made a first determination as to what the user requested for each of the five episodes. In the first four of the five episodes, the user desired directions to the restaurant. In the fifth episode, the user desired stock information about the publicly traded company that owns the restaurant. The approved results, of the processed voice instruction, including four requests for directions and one request for stock information are recorded by the processor 193 with the voice instruction for each episode. The next time the user provides that same voice instruction, the processor 193 can use the previously recorded approved results for processing the new voice instruction.

Various methods of using the previously recorded approved results can be performed. In a first method, the most frequently recorded result becomes the result of the newly provided specific voice instruction. So, using the example above, directions are provided to the user, because the recorded results show requests for directions to the restaurant occurring more frequently than requests for stock information, or other types of requests. In a second method, a most recent recorded result becomes the result of the newly provided specific voice instruction. So, using the example above, stock information is provided to the user, because the last recorded result was a request for stock information.

With respect to the first four episodes described above, the processor 193 processes the voice instruction as either a request for directions or as a request for something other than directions. If the voice instruction was processed as a request for directions, the user can approve of the processing, and the resulting request for directions to the restaurant is recorded with the voice instruction for that episode. If the voice instruction was processed as a request for something other than directions, the user can make a further request to the processor 193 to provide directions, thereby indicating that the processing of the voice instructions was incorrect.

The user can indicate that the processing was incorrect in a number of different ways. A user can correct the processing by contacting a human operator (block 205). The human operator can make the change for that episode and the change is recorded. A correction can also be made by submitting a subsequent voice instruction request to the processor 193 for reinterpreting the original voice instruction. Returning to the previous example, once the voice instruction has been corrected by changing to a request for directions and the user approves of the change, the result of the directions to the restaurant is recorded with the voice instruction for that episode.

Communication between a driver of a vehicle and an agent at a call center can occur through messaging. As the agent and the driver communicate, their voices are captured, digitized, compressed and sent to a server. The server routes the voice segments to a call center agent desktop application, which includes a human call center agent sitting in front of an agent console, including a screen, keyboard, speaker, microphone, and headset. The agent can interact with multiple vehicles, each vehicle represented by a session on the agent's screen. Each communication session is represented by a window that displays icons representing the received utterances from the vehicle.

The agent can listen to a specific utterance by selecting the corresponding icon with a mouse. In a further embodiment, the voice from the driver of the vehicle is first processed by a speech to text recognition engine then placed as text into that window.

To reply to a specific driver of a vehicle, the agent types in the corresponding window for that vehicle. The typed text is converted to voice output by a text to speech server, compressed, and sent back to the vehicle. The typed text is first stored in the TCU, then decompressed and played to the driver. In a further embodiment, the operator can speak the reply rather than typing a response. Both the driver and the operator can listen to an utterance of the message again by asking their respective device to replay the utterance.

The agent can interact with multiple vehicles simultaneously. A log of each conversational session can be kept by the agent at the call center, as well as by the driver of the vehicle participating in that conversation. The agent or the driver can listen to previously stored instructions. The agent can be much more efficient since he does not need to ask the driver to repeat the utterance or to apologize for putting the driver on hold (the efficiency is implied by the half duplex message oriented nature of the communication.)

Agent messaging allows agents to multitask between several customers simultaneously using multiple windows. The customers can each communicate with an agent through voice media. The agents receive the voice messages from multiple customers, which are queued up for the agents to peruse in sequence. Other related features are possible, such as limited agent control of other client applications.

Communication between a customer and a call center agent can include two application programs: one for the customer (TCU), client, and one for the agent, server. The server is designed for store-and-forward message passing between individual customers and agents. The agent's application program can include some form of Windows, executable with a non-browser GUI. The customer application program is an application running on the TCU. Messages from the customers to the agents can be audio recordings, while messages from the agents to the customers are primarily text messages passed through a text-to-speech engine. However, other methods of communication are possible, including allowing agents to send audio messages and customers to send text messages.

For example, a customer contacts an agent because he is lost and wants directions to a specific location. The customer's position and recent movements can be uploaded for review by the agent. Based on the customer's position, the agent can control a navigation application and provide directions to the specific location.

In a further example, a customer's vehicle has failed or was involved in an accident; however, emergency services do not need to be summoned. The vehicle information is uploaded based on a connection to a CAN bus. The customer position is also uploaded.

In yet a further example, an agent can perform a concierge service for the customer, which can be handled quickly, such a securing tickets to a show. Obtaining the tickets can often take under five minutes; however, other times are possible. External services, such as a ticket Web page can be used by the agent via the agent console. The agent can access the customer's Personal Digital Assistant (PDA) or other form of electronic scheduling device through synchronization to determine the customer's availability to attend the show. The PDA can include information such as calendar items, addresses, or phone numbers. The agent can also access the customer's preferences and information, such as credit card information and email for conducting the service. Once the tickets are obtained, a confirmation of the service is sent to the customer via an email.

In yet a further example, an agent can perform a concierge service for the customer, which takes a long time, such as placing reservations at a restaurant that is not answering their phone. Services that take over 30 minutes to complete can be considered long-term services. Other time limits can be used. The agent follows the same steps for the short-term concierge services; however, a pause session is usually required due to the length of time required to complete the service. The agent can initiate a session restart once the service has been completed.

Communication between the customer and the agent can include transmitting a new customer voice request, position, and vehicle information to the agent. The agent can have control of other customer vehicle applications at the same time as the receipt of the new customer's voice request. During each session, the agent can use external services via the agent console. Access to each customer's PDA can be obtained through synchronization. The agents can view customer data from the PDA, including phone numbers, schedule items, to-do items, and other data. Customer preferences can also be obtained to assist in completing the request. Once the request is complete, the agent can send a confirmation, such as a summary notice by email. If the request requires a large period of time to complete, client disconnection can occur with intermittent reconnection to check for delayed responses.

Message requests from multiple clients can be queued for handling by a single agent. A client for the customer and a client for the agent can communicate with a single server. The agent sends back a reply message, which is queued for later playback, when the driver is ready. Problematic voice-recognition situations to the agent, such as unrecognizable voice data, can be automatically handed-off to an agent who is informed of the context. Data can be considered unrecognizable if the data is not understood correctly after three attempts. Other classifications of unrecognizable data are possible.

The agent can access and control each customer profile. Incoming requests from customers can be prioritized by factors, such as time constraints, as well as other factors. For example, the agent can designate customer X as needing a quick turnaround of all responses. Customer X's requests are inserted close to the head of the queue rather than at the end.

The agent application program can include scripts, shortcuts, and other tools for providing common responses, such as "I'm sorry sir, there are no tickets for that performance. Is there another time which might also work?" The agent can annotate the communication for review by themselves or others, or to refresh their context when restarting a paused session.

The communication between the customer and the agent can be archived for some period of time. The archived communication can be used to review or make a copy of old communication. If available, the agent can invisibly serve as a voice recognition tool for another application. For example, a customer requests weather information for a city. After a second failed attempt to recognize the data, the agent receives the audio for the customers' third attempt with the annotation for a city.

If the customer is arranging a scheduled item, such as reservations for the theatre or another event, the agent can automatically check for conflicts with the customer's schedule on the customer's PDA. The agent may not know what the conflicting item is, only that a conflict exists.

An agent starts the agent application program, using an agent identifier, such as a login name or other identifier, recognizable by the server. The agent application program manages a queue of lines of communication with multiple customers. When a customer wishes to talk with an agent, the client application negotiates with the server to establish a session with a particular agent. Each customer may have a regular or default agent who is familiar with that customer, though the workload should be balanced across all working agents. The agent's work includes pushing a 'next message' button, which brings up the next message in the queue. When pressed, the agent gets the most recent audio from the customer presented to them. On the agent's screen is a transcript of the conversation with this customer. The transcript is a combination of the customer's audio recordings and the agent's text-based responses and commands. The transcript of the communication will likely be interleaved, so the application program will allow the agent to select specific lines of the transcript. If the transcript is a text message, the full text will be displayed, or if the transcript is audio communication, the customer's audio recoding will be replayed. The transcript can be scrolled back indefinitely, even to a previous session on a previous day, week, or as storage permits, as well as other times. Besides the transcript, other information about the queue is available, such as how many other customers are waiting, average wait time, or relative priorities of the customers in the queue, as well as other information.

The agent can also have information about the customer from a database available through the agent's console. The information can include, for example, customer and family names, preferred salutations, and addresses of important locations, as well as other information. The agent application program allows agents to respond to customers, either to enter text directly, to respond with shortcuts that have common phrases, to incorporate the customer's profile information, and to respond with commands that may cause functional changes on the client machine, such as by specifying a new destination for the navigation component or by downloading an address to their PDA, as well as other types of responses. The agent can modify the customer's relative priority in the queue. Thus, based on how quickly the customer needs a response the message can enter the queue at a higher priority and thus skip ahead of other customers. For example, customer A has car engine difficulties while customer B wants to purchase a compact disc. The request from customer A enters the agent's queue at a higher priority than the request from customer B.

While the invention has been particularly shown and described as referenced to the embodiments thereof, those skilled in the art will understand that the foregoing and other changes in form and detail may be made therein without departing from the spirit and scope of the invention.

APPENDIX

To specify an alert message string, use:
  ALERT string
To specify an unconditional branch to label, use:
  GOTO label
To specify a conditional cond branch to label, use:
  IF cond THEN GOTO label
To specify a label string for a branch, use:
  LABEL string
To terminate execution, use:
  QUIT
To specify a synthesized speech utterance string, use:
  SAY string
To specify a script name string, use:
  SCRIPTNAME string
To specify a variable name varname, use:
  SET varname
To specify a subscript scriptname, use:
  SUBSCRIPT scriptname
To specify a wait condition string, use:
  WAITFOR string <YES|NO|DATE|PHONENUM|CUSTID>

What is claimed is:

1. A system for processing multi-modal communications, comprising:
  a call received into a call center via a telephone, wherein the call comprises an inquiry of incoming speech utterances from a caller;
  an automatic call distributor to assign the call to an agent within the call center;
  a speech-to-text generator to generate transcribed text by performing automatic speech recognition on the incoming speech utterances;
  a display to display the transcribed text to the agent;
  text messages separately received into the call center during the call from the caller via the telephone;
  a identification module to identify the text messages as originating from the caller of the call; and
  the display to display the text messages to the agent of the call.

2. A system according to claim 1, further comprising:
  an assignment module to assign a caller identification number to the call and to further assign the caller identification number to each of the text messages; and
  a match module to match the text messages to the call via the caller identification numbers upon arrival into the call center.

3. A system according to claim 1, further comprising:
  a log of the call comprising the transcribed text and the text messages.

4. A system according to claim 3, further comprising:
  a flagging module to flag the text messages in the log as verbatim caller data.

5. A system according to claim 1, further comprising:
  a receipt module to receive from the agent, a response to the caller's inquiry; and
  a delivery module to provide the response to the caller.

6. A system according to claim 5, wherein the response from the agent is one of a manually determined response and a predetermined response.

7. A system according to claim 5, wherein the response comprises one or more of reply text messages and reply speech utterances.

8. A system according to claim 7, further comprising:
  a text-to-speech converter to convert the text messages of the agent to synthesized speech utterances before providing the response to the caller.

9. A system according to claim 1, further comprising:
  a monitor to simultaneously monitor at least one other call assigned to the agent with the call by the caller;
  a receipt module to receive incoming speech utterances and text messages from a caller of the other call; and
  the display to display the incoming speech utterances and text messages.

10. A system according to claim 1, further comprising:
  a delivery module to provide the incoming speech utterances to the agent with the transcribed text.

11. A method for processing multi-modal communications, comprising:
  receiving a call via a telephone into a call center, wherein the call comprises an inquiry of incoming speech utterances from a caller;
  assigning the call to an agent within the call center;
  generating transcribed text by performing automatic speech recognition on the incoming speech utterances;
  displaying the transcribed text to the agent via a display;
  separately receiving into the call center during the call, text messages from the caller via the telephone;
  identifying the text messages as originating from the caller of the call; and
  displaying the text messages to the agent.

12. A method according to claim 11, further comprising:
  assigning a caller identification number to the call;
  further assigning the caller identification number to each of the text messages; and
  matching the text messages to the call via the caller identification numbers upon arrival into the call center.

13. A method according to claim 11, further comprising:
  generating a log of the call comprising the transcribed text and the text messages.

14. A method according to claim 13, further comprising:
  flagging the text messages in the log as verbatim caller data.

15. A method according to claim 11, further comprising:
  receiving from the agent, a response to the caller's inquiry; and
  providing the response to the caller.

16. A method according to claim 15, wherein the response from the agent is one of a manually determined response and a predetermined response.

17. A method according to claim 15, wherein the response comprises one or more of reply text messages and reply speech utterances.

18. A method according to claim 17, further comprising:
  converting the text messages of the agent to synthesized speech utterances before providing the response to the caller.

19. A method according to claim 11, further comprising:
simultaneously monitoring at least one other call assigned to the agent with the call by the caller;
receiving incoming speech utterances and text messages from a caller of the other call; and
displaying the incoming speech utterances and text messages on the display of the agent.

20. A method according to claim 11, further comprising:
providing the incoming speech utterances to the agent with the transcribed text.

* * * * *